US012485591B2

United States Patent
Hartmann et al.

(12) United States Patent
(10) Patent No.: US 12,485,591 B2
(45) Date of Patent: Dec. 2, 2025

(54) SYSTEMS AND METHODS FOR MANUFACTURING AN ARTICLE OF FOOTWEAR

(71) Applicant: PUMA SE, Herzogenaurach (DE)

(72) Inventors: Matthias Hartmann, Forchheim (DE); Pairush Sermpongs, Ayutthaya Province (TH)

(73) Assignee: PUMA SE, Herzogenaurach (DE)

( * ) Notice: Subject to any disclaimer, the term of this patent is extended or adjusted under 35 U.S.C. 154(b) by 149 days.

(21) Appl. No.: 18/093,077

(22) Filed: Jan. 4, 2023

(65) Prior Publication Data

US 2023/0364835 A1 Nov. 16, 2023

Related U.S. Application Data

(60) Provisional application No. 63/358,327, filed on Jul. 5, 2022, provisional application No. 63/341,576, filed on May 13, 2022.

(51) Int. Cl.
B29C 44/34 (2006.01)
B29L 31/50 (2006.01)

(52) U.S. Cl.
CPC ........ *B29C 44/348* (2013.01); *B29C 44/3446* (2013.01); *B29L 2031/504* (2013.01)

(58) Field of Classification Search
CPC .. B29C 44/348; B29C 44/3453; B29D 35/142
See application file for complete search history.

(56) References Cited

U.S. PATENT DOCUMENTS

| 2004/0198853 A1 | 10/2004 | Saito |
| 2017/0174856 A1* | 6/2017 | Tsai ................. B29B 11/14 |
| 2019/0389100 A1* | 12/2019 | Lin .................. B29C 44/588 |
| 2020/0281314 A1 | 9/2020 | Stockbridge |
| 2021/0114324 A1* | 4/2021 | Liu .................. B29D 35/122 |
| 2021/0145116 A1* | 5/2021 | Kvamme .......... B29D 35/122 |

FOREIGN PATENT DOCUMENTS

| EP | 3424695 A1 * | 1/2019 | ...... B29D 35/122 |
| WO | 1992017533 A1 | 10/1992 | |
| WO | 2021050938 A1 | 3/2021 | |

OTHER PUBLICATIONS

Extended European Search Report (EESR) of European Application No. 23172487.3, mailed Sep. 27, 2023 (8 pages).

* cited by examiner

*Primary Examiner* — Jacob T Minskey
*Assistant Examiner* — Irak Nguon
(74) *Attorney, Agent, or Firm* — Quarles & Brady LLP

(57) ABSTRACT

A method for manufacturing a foam component of a sole structure includes positioning a preformed component within a cavity of an autoclave, heating the preformed component to be at or above a glass transition temperature of a material of the preformed component, and pressurizing the autoclave. The method further includes injecting a blowing agent into the cavity of the autoclave, which becomes a supercritical fluid that saturates the preformed component, and dropping the pressure within the cavity. The drop in pressure causes nucleation of the supercritical fluid within the preformed component to expand and crystallize the material of the preformed component to form the final foam component so that the foam component has a substantially uniform density.

20 Claims, 18 Drawing Sheets

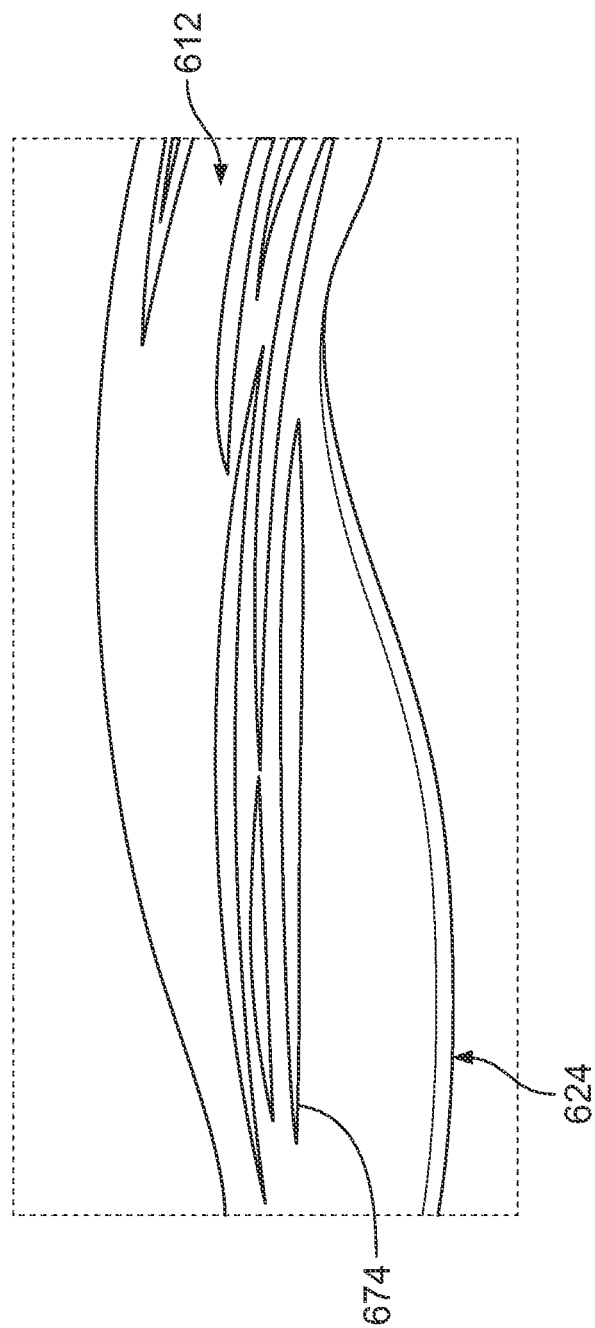

SYSTEMS AND METHODS FOR MANUFACTURING AN ARTICLE OF FOOTWEAR

CROSS REFERENCE TO RELATED APPLICATIONS

This patent application claims the benefit of U.S. Provisional Patent Application 63/358,327, filed on Jul. 5, 2022, and U.S. Provisional Patent Application 63/341,576, filed on May 13, 2022, the entire contents of which is hereby incorporated by reference, for any and all purposes.

REFERENCE REGARDING FEDERALLY SPONSORED RESEARCH OR DEVELOPMENT

Not applicable.

SEQUENCE LISTING

Not applicable.

BACKGROUND

1. Field of the Invention

The present disclosure relates generally to manufacturing a portion of an article of footwear using a mold, and more particularly, a portion of a sole structure of an article of footwear.

2. Description of Background

Generally, an article of footwear includes an upper defining an interior space configured to receive a foot of a user. A sole structure is typically attached to a lower end of the upper to extend between the upper and a support surface, e.g., the ground. As a result, the sole typically provides stability and cushioning to the user when the shoe is being worn and/or is in use. In some instances, the sole may include multiple components, such as an outsole, a midsole, and an insole. The outsole may provide traction to a bottom surface of the sole, and the midsole may be attached to an upper surface of the outsole to extend generally between the outsole and the upper.

In many cases, at least a portion of the sole structure, e.g., the midsole, can be a foam component that is formed using one or more molds. With conventional processes, such foam components are typically formed using either an injection molding process or a compression molding process. In an injection molding process, a liquid material, typically a polymeric material, is injected into a mold cavity and cured to form the foam component. In a compression molding process, a blank is placed in a mold and then heated to expand the blank within the mold to form the foam component. However, such conventional molding processes can limit performance characteristics of the molded component, for example, cushioning, elasticity, stability, density, and weight. Further, in some cases, particularly with compression molding processes, mold release agents must be used between the foam component and the mold to prevent sticking, but these same release agents can also inhibit the attachment of other sole components, such as an outsole.

SUMMARY

A method of manufacturing a foam component for an article of footwear, as described herein, can include forming a foam component by expanding a preformed component, e.g., a blank, made from one or more sub-components within a mold cavity using a supercritical fluid. In some cases, the method can eliminate the need for compression of the foam component after expansion and can also eliminate the need to use mold release agents.

According to an aspect of the disclosure, a method for manufacturing a foam component of a sole structure can include positioning a preformed component within a cavity of an autoclave, heating the preformed component to be at or above a glass transition temperature of a material of the preformed component, and pressurizing the autoclave. A blowing agent can be injected into the cavity of the autoclave. The blowing agent can become a supercritical fluid that saturates the preformed component. The pressure within the cavity of the autoclave can be dropped to cause nucleation of the supercritical fluid within the preformed component, and to substantially uniformly expand and crystallize the material of the preformed component to form the foam component. The foam component can have a substantially uniform density.

In some embodiments, an expansion ratio between the preformed component can be between 1.4 and 1.8 (inclusive). More specifically, the expansion ratio can be about 1.6. In some cases, a release agent is not applied to the preform component.

In some embodiments, the method can further include forming the preformed component by injecting the material of the preformed component into a mold. The material of the preformed component can be in a liquid state, which can be allowed to cure within the mold to form a solid body. In some cases, the material of the preformed component can be a thermoplastic polymer.

In some embodiments, the method can father include removing the foam component from the autoclave and securing a second component to the foam component. Securing the second component can include at least one of applying an adhesive between the foam component and the second component, or overmolding the second component onto the foam component. In some cases, the foam component can be a midsole and the second component can be at least one of an upper or a midsole.

In some embodiments, the foam component can include a plurality of cells with approximately uniform size and distribution throughout the foam component. In some cases, the density of the foam component can have a variance of less than or equal to approximately 15%. An average density of the foam component can be less than approximately 0.13 g/cm$^3$. In some cases, a shore C hardness of the foam component can have a variance of less than or equal to approximately 6%.

In some embodiments, the blowing agent can be nitrogen gas. In some embodiments, pressurizing the autoclave can include raising a pressure within the cavity of the autoclave from a first pressure to a second pressure and dropping the pressure can include reducing the pressure within the cavity of the autoclave from the second pressure to a third pressure. The third pressure can be at or below the first pressure.

According to another aspect of the disclosure, a method for manufacturing a sole structure can include forming a preformed component and foaming the preformed component to form a midsole. Foaming the preformed component can include positioning the preformed component within an autoclave, heating the preformed component to be at or above a glass transition temperature of the preformed component, and pressurizing the autoclave. Foaming the preformed component can also include saturating the preformed component with a supercritical fluid and dropping the pressure within the autoclave. Dropping the pressure within the autoclave can cause nucleation of the supercritical fluid within the preformed component, and can expand and crystallize a material of the preformed component to form a midsole. A density of the midsole can have a variance of less than or equal to approximately 15%. The midsole can be removed from the autoclave and an outsole can be secured to a bottom surface of the midsole to form the sole structure. In some embodiments, the midsole can be at a final size upon removal from the autoclave.

According to yet another aspect of the disclosure, a method for manufacturing a foam component of a sole structure can include positioning a preformed component within a cavity of an autoclave. The preformed component can be heated to be at a first temperature that is at or above a glass transition temperature of a material of the preformed component. The autoclave can be pressurized to a pressure that is selected in in accordance with the first temperature so that a blowing agent within the autoclave becomes a supercritical fluid. The pressure within the cavity of the autoclave can be dropped to cause nucleation of the supercritical fluid within the preformed component, and to expand and crystallize the material of the preformed component to form the foam component. The foam component can expand to be at a final size within the autoclave. An expansion ratio between the preformed component and the foam component can be between about 1.4 and about 1.8 (inclusive).

In some embodiments, the method can further include injecting the blowing agent into the autoclave. The blowing agent can be nitrogen gas. In some cases, the supercritical fluid, e.g., the blowing agent in a supercritical state, can be allowed to saturate the preformed component for a predetermined period of time.

Other aspects of the articles of footwear or portions of the articles of footwear described herein, as well as methods of making the same, including features and advantages thereof, will become apparent to one of ordinary skill in the art upon examination of the figures and detailed description herein. Therefore, all such aspects of the articles of footwear are intended to be included in the detailed description and this summary.

BRIEF DESCRIPTION OF THE DRAWINGS

FIG. 18 is a detail view of the foam component of FIG. 16 taken about line VXIII-VXIII

DETAILED DESCRIPTION OF THE DRAWINGS

Figure 1:
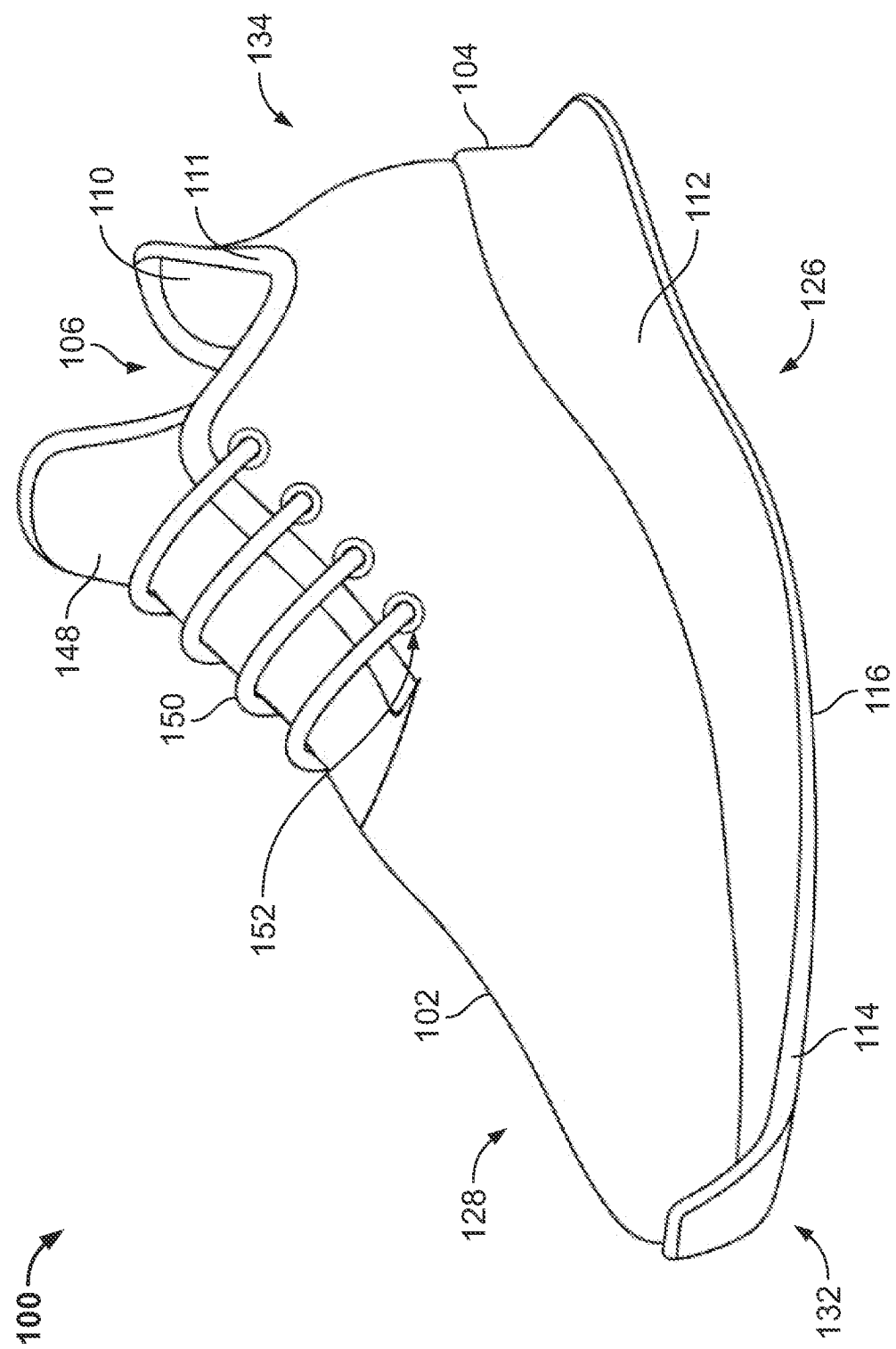
FIG. 1 is a top and lateral perspective view of an article of footwear according to aspects of the disclosure.
Figure 2:
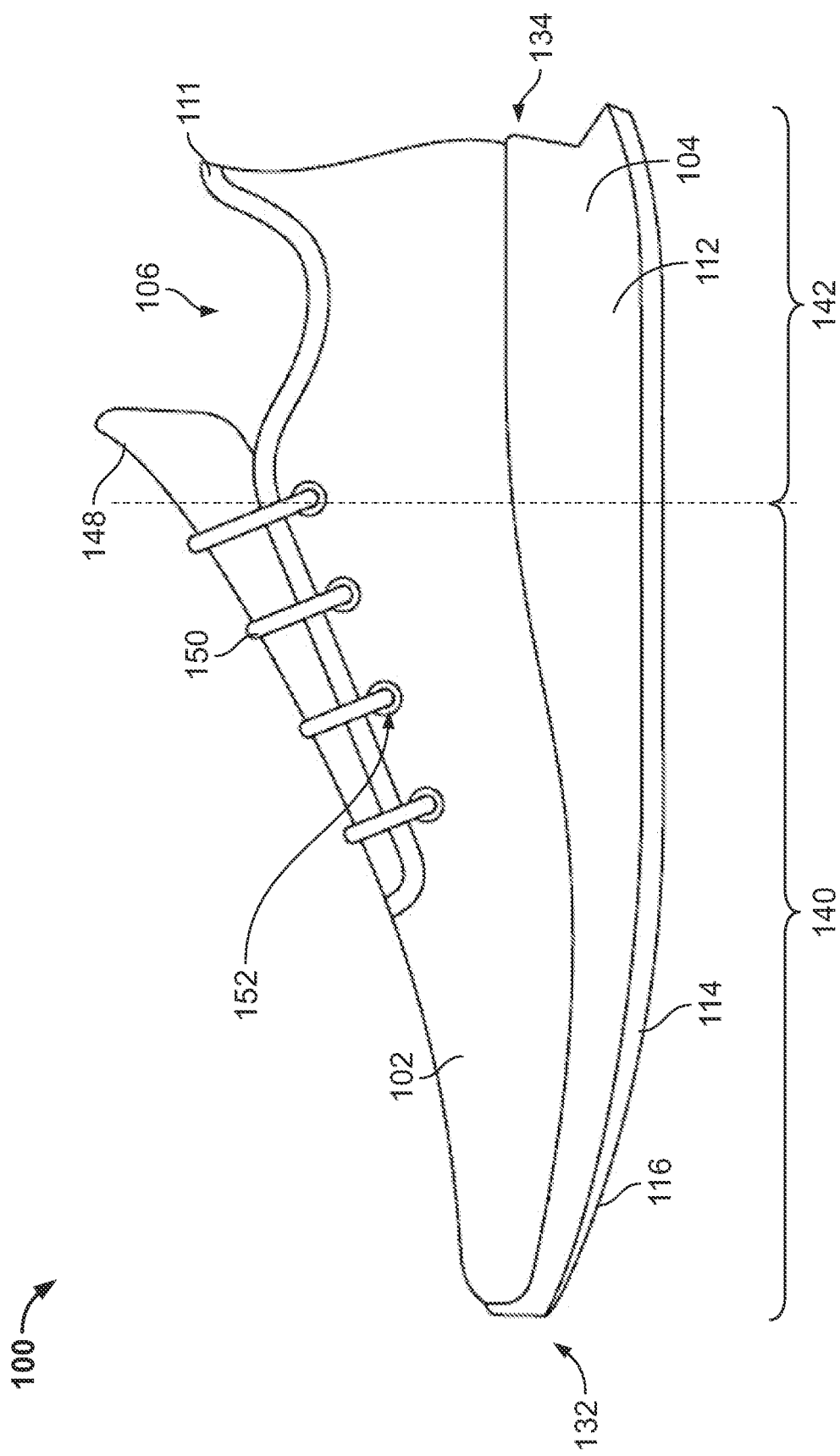
FIG. 2 is a lateral side view of the article of footwear of FIG. 1.

The following discussion and accompanying figures disclose various embodiments or configurations of a shoe. Although embodiments are disclosed with reference to a sports shoe, such as a running shoe, tennis shoe, basketball shoe, etc., concepts associated with embodiments of the shoe may be applied to a wide range of footwear and footwear styles, including basketball shoes, cross-training shoes, football shoes, golf shoes, hiking shoes, hiking boots, ski and snowboard boots, soccer shoes and cleats, walking shoes, and track cleats, for example. Concepts of the shoe may also be applied to articles of footwear that are considered non-athletic, including dress shoes, sandals, loafers, slippers, and heels. In addition to footwear, particular concepts described herein may also be applied and incorporated in other types of articles, including apparel or other athletic equipment, such as helmets, padding or protective pads, shin guards, and gloves. Even further, particular concepts described herein may be incorporated in cushions, backpacks, suitcases, backpack straps, golf clubs, or other consumer or industrial products. Accordingly, concepts described herein may be utilized in a variety of products.

The term "about," as used herein, refers to variation in the numerical quantity that may occur, for example, through typical measuring and manufacturing procedures used for articles of footwear or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "near," "about," and "approximately" refer to a range of values±5% of the numeric value that the term precedes.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Further, as used herein, unless otherwise defined or limited, directional terms are used for convenience of reference for discussion of particular figures or examples. For example, references to "downward," or other directions, or "lower" or other positions, may be used to discuss aspects of a particular example or figure, but do not necessarily require similar orientation or geometry in all installations or configurations.

The terms first, second, third, etc. may be used herein to describe various elements, components, regions, layers and/or sections. These elements, components, regions, layers and/or sections should not be limited by these terms. These terms may be only used to distinguish one element, component, region, layer, or section from another region, layer, or section. Terms such as "first," "second," and other numerical terms do not imply a sequence or order unless clearly indicated by the context. Thus, a first element, component, region, layer, or section discussed below could be termed a second element, component, region, layer, or section without departing from the teachings of the example configurations.

The present disclosure is directed to an article of footwear or specific components of the article of footwear, such as an upper or a sole or sole structure, and methods for making the same. The upper may comprise a knitted component, a woven textile, a non-woven textile, leather, mesh, suede, or a combination of one or more of the aforementioned materials. The knitted component may be made by knitting of yarn, the woven textile by weaving of yarn, and the non-woven textile by manufacture of a unitary non-woven web. Knitted textiles include textiles formed by way of warp knitting, weft knitting, flat knitting, circular knitting, or other suitable knitting operations. The knit textile may have a plain knit structure, a mesh knit structure, or a rib knit structure, for example. Woven textiles include, but are not limited to, textiles formed by way of any of the numerous weave forms, such as plain weave, twill weave, satin weave, dobbin weave, jacquard weave, double weaves, or double cloth weaves, for example. Non-woven textiles include textiles made by air-laid or spun-laid methods, for example. The upper may comprise a variety of materials, such as a first yarn, a second yarn, or a third yarn, which may have varying properties or varying visual characteristics.

In some embodiments, the upper may comprise an inner layer and an outer layer, which may provide a mixture of stretch and stability. The inner layer and the outer layer may be attached to one another by stitching, an adhesive, welding, or other connection methods as are known in the art. The inner layer may be made of material that allows the upper to stretch in multiple directions, for example, a 4-way stretch material, so that the upper is both snug and comfortable, and can conform to the foot of a user. In addition to providing the upper with a layer that is flexible and can better conform to a foot of a user, the inner layer may provide for a more comfortable upper that reduces friction or other rubbing between the foot of a user and the upper. The outer layer is made from a resilient woven material, which may resist stretching.

In some cases, the upper may further include a heel cup coupled to and substantially surrounding the heel of a user. The heel cup is a rigid or semi-rigid structure that may provide additional support for the foot of a user. The heel cup may be made of a plastic, for example, TPU, or a composite material. In some cases, the heel cup is transparent or translucent.

In addition, the present disclosure relates to an article of footwear having a sole structure attached to the upper. The sole structure includes a midsole that may be attached to the upper, an outsole attached below the midsole and defining a bottom of the article of footwear, and a number of sole elements. In some embodiments, the midsole and the outsole may be a unitary body made from a foam or a rubber material, which cushion the user's foot as it impacts the ground and gives the user traction. In other embodiments, the midsole and the outsole may constitute different components which may be co-molded or adhered together by a glue or other adhesive. The midsole may be a foamed thermoplastic element that provides cushioning for a user. As a few particular examples, the midsole may be made from one or more thermoplastic materials, such as thermoplastic polyurethane, ethylene-vinyl acetate, nylon, nylon polyamide, thermoplastic elastomer, thermoplastic polyamide, etc. In some cases, a midsole can include other types of materials, including non-thermoplastic materials. The outsole may be a rubber material to increase traction and durability. In some cases, the midsole can be a multi-density midsole with two or more layers having different densities to provide tuned cushioning characteristics. Additionally, the outsole may be formed from one or more outsole sections, which can be received within a corresponding recess formed in a bottom of the midsole.

FIGS. 1-5 depict an exemplary embodiment of an article of footwear 100 including an upper 102 and a sole structure 104. As will be discussed in further detail below, the upper 102 is coupled with the sole structure 104 and together with the sole structure 104 defines an interior cavity 106 (see FIG. 4) into which a foot of a user may be inserted. The upper 102 may also include an insole 108 (see FIG. 4) positioned within the interior cavity 106 that may be connected to or in contact with an interior surface of the article of footwear 100. The insole 108 may directly contact a user's foot while the article of footwear 100 is being worn. In some embodiments, an upper may include a liner 110 that makes the article of footwear 100 more comfortable to wear, for example, by reducing friction between the foot of the user and the article of footwear 100 when the article of footwear 100 is being worn, or providing moisture wicking properties. The liner 110 may line the entire interior cavity 106 or only a portion of the interior cavity 106. In other embodiments, a collar or binding 111 may surround the opening of the interior cavity 106 to secure the liner 110 to the upper 102 or to provide an aesthetic element on the article of footwear 100. Furthermore, the sole structure 104 includes a midsole 112 and an outsole 114 coupled to and disposed generally below the midsole 112. The outsole 114 defines a bottom surface 116 of the article of footwear 100 that is configured to contact the ground. In some embodiments, lugs (not shown) or other tractive elements may be provided along the bottom surface 116 to provide a user with increased traction.

The article of footwear 100 generally defines a forefoot region 120, a midfoot region 122, and a heel region 124. The forefoot region 120 generally corresponds with portions of the article of footwear 100 that encase portions of the foot that include the toes, the ball of the foot, and joints connecting the metatarsals with the toes or phalanges. The midfoot region 122 is proximate and adjoining the forefoot region 120, and generally corresponds with portions of the article of footwear 100 that encase the arch of a foot, along with the bridge of a foot. The heel region 124 is proximate and adjoining the midfoot region 122 and generally corresponds with portions of the article of footwear 100 that encase rear portions of the foot, including the heel or calcaneus bone, the ankle, or the Achilles tendon.

Figure 3:
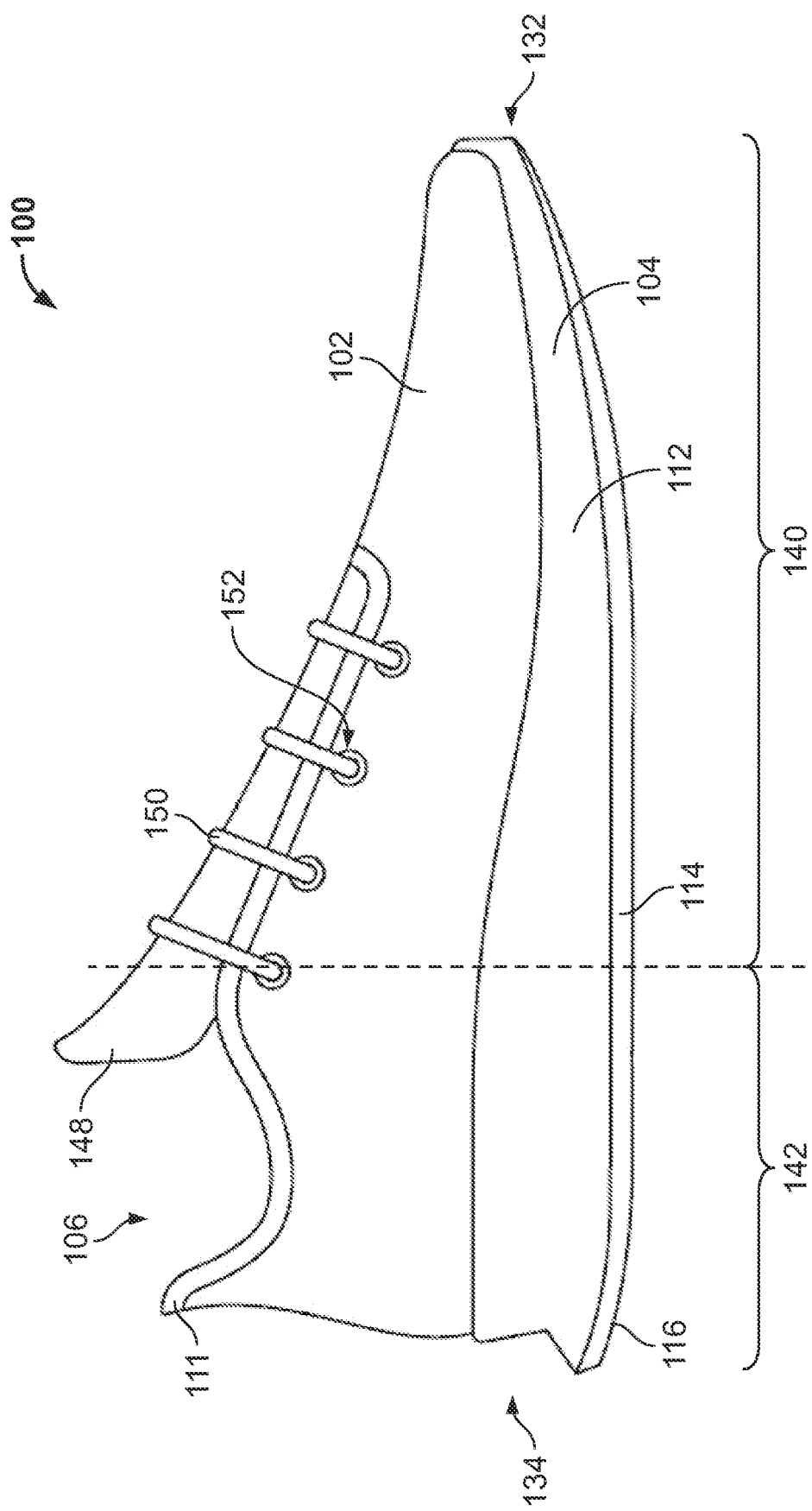
FIG. 3 is a medial side view of the article footwear of FIG. 1.
Figure 4:
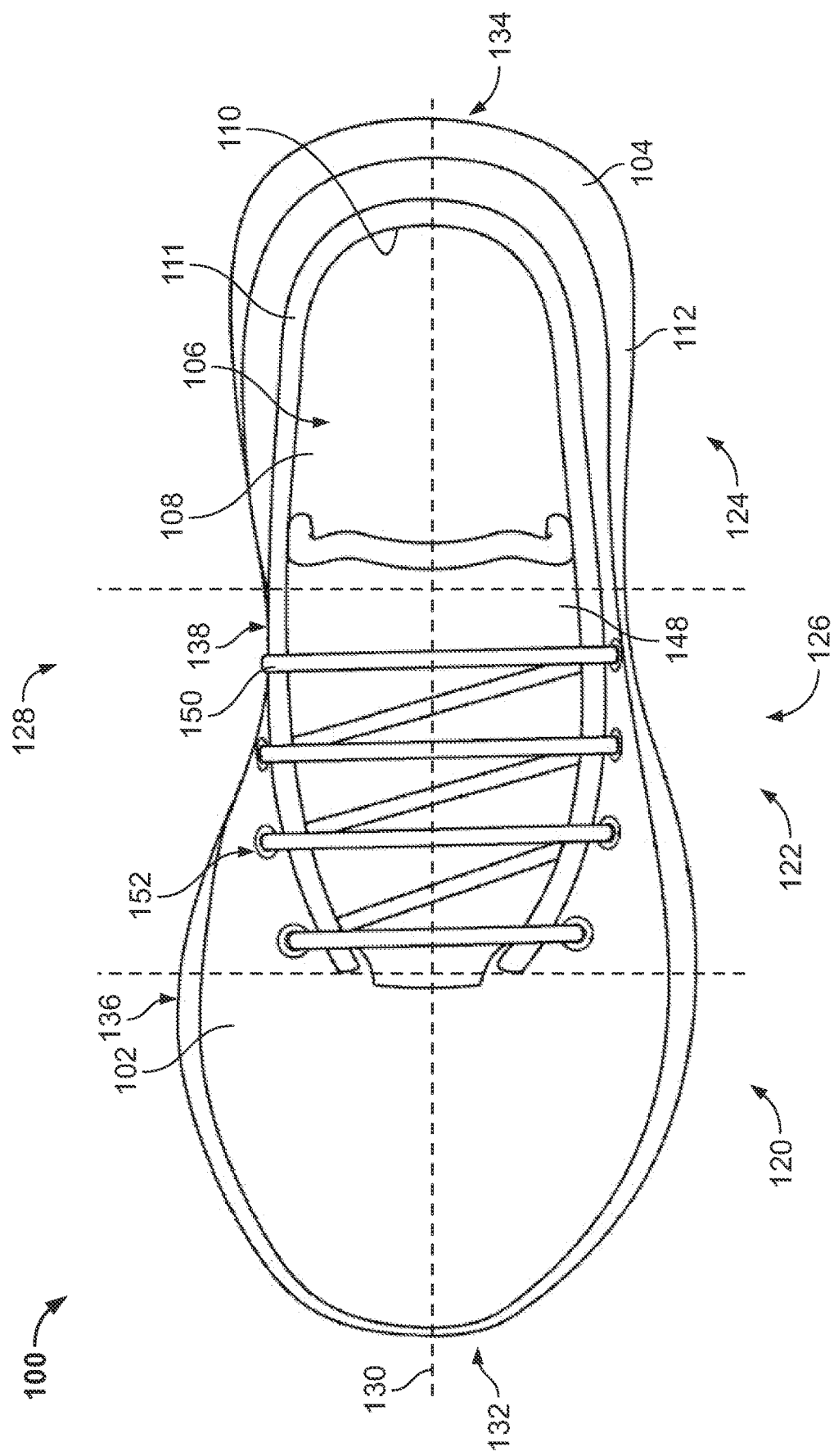
FIG. 4 is a top plan view of the article of footwear of FIG. 1.
Figure 5:
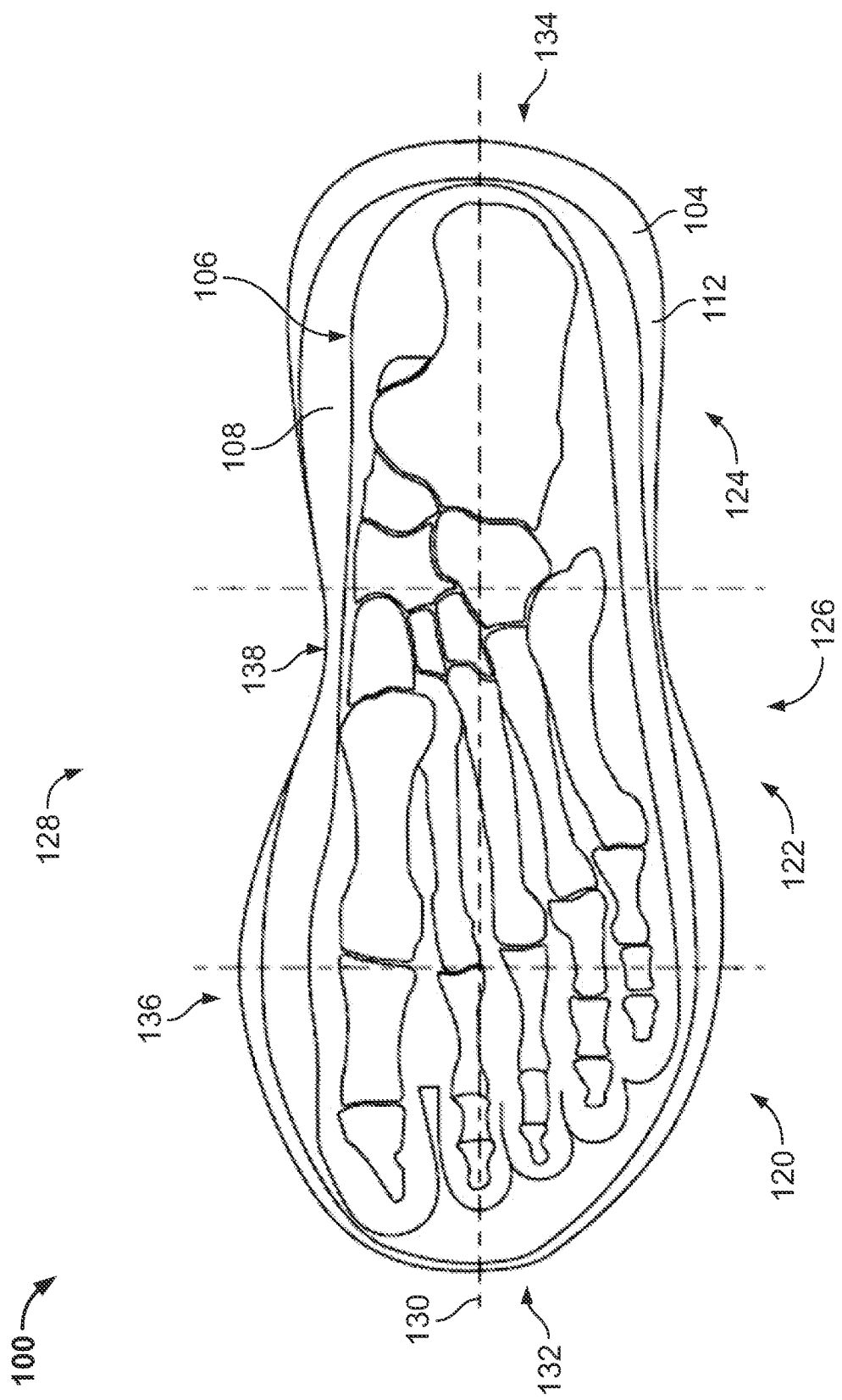
FIG. 5 is a top plan view of the article of footwear of FIG. 1, with an upper removed and a user's skeletal foot structure overlaid on the article of footwear.

The article of footwear 100 also defines a lateral side 126 (see FIG. 2), and a medial side 128 (see FIG. 3). Further, the article of footwear 100 defines a longitudinal axis 130 (see FIG. 3) that extends from a toe end 132, located at a distal end of the forefoot region 120, to a heel end 134, located at a distal end of the heel region 124 opposite the toe end 132. The longitudinal axis 130 defines a middle of the article of footwear 100 with the lateral side 126 extending from one side of the longitudinal axis 130 and the medial side 128 extending from the other. Put another way, the lateral side 126 and the medial side 128 adjoin one another along the longitudinal axis 130. In particular, the lateral side 126 corresponds to an outside portion of the article of footwear 100 and the medial side 128 corresponds to an inside portion of the article of footwear 100. As such, left and right articles of footwear have opposing lateral 126 and medial 128 sides, such that the medial sides 128 are closest to one another when a user is wearing the article of footwear 100, while the lateral sides 126 are defined as the sides that are farthest from one another while being worn.

The forefoot region 120, the midfoot region 122, the heel region 124, the medial side 128, and the lateral side 126 are intended to define boundaries or areas of the article of footwear 100, and collectively span an entire length of the article of footwear 100, from the toe end 132 to the heel end 134. It should be appreciated that aspects of the disclosure may refer to portions or elements that are coextensive with one or more of the forefoot region 120, the midfoot region 122, the heel region 124, the medial side 128, or the lateral side 126. The forefoot region 120 extends from the toe end 132 to a widest portion 136 of the article of footwear 100, i.e., a distance between the medial side 128 and the lateral side 126 of the sole structure 104. The midfoot region 122 extends from the widest portion 136 to a thinnest portion 138 of the article of footwear 100, i.e., a distance between the medial side 128 and the lateral side 126 of the sole structure 104. The heel region 124 extends from the thinnest portion 138 to the heel end 134 of the article of footwear 100.

The lateral side 126 begins where the toe end 132 intersects the longitudinal axis 130 and bows outward, i.e., away from the longitudinal axis 130, along the forefoot region 120 toward the midfoot region 122. At the widest portion 136, the lateral side 126 bows inward, i.e., toward the longitudinal axis 130 toward the thinnest portion 138, entering the midfoot region 122. Upon reaching the thinnest portion 138, the lateral side 126 bows outward and extends into the heel region 124. The lateral side 126 then bows back inward toward the heel end 134 and terminates where the heel end 134 intersects with the longitudinal axis 130.

The medial side 128 begins where the toe end 132 intersects the longitudinal axis 130 and bows outward, i.e., away from the longitudinal axis 130, along the forefoot region 120 toward the midfoot region 122. At the widest portion 136, the medial side 128 bows inward, i.e., toward the longitudinal axis 130, toward the thinnest portion 138, entering the midfoot region 122. Upon reaching the thinnest portion 138, the medial side 128 bows outward and extends into the heel region 124. The medial side 128 then bows back inward toward the heel end 134 and terminates where the heel end 134 intersects with the longitudinal axis 130.

It should be understood that numerous modifications may be apparent to those skilled in the art in view of the foregoing description, and individual components thereof, may be incorporated into numerous articles of footwear. Accordingly, aspects of the article of footwear 100 and components thereof, may be described with reference to general areas or portions of the article of footwear 100, with an understanding the boundaries of the forefoot region 120, the midfoot region 122, the heel region 124, the lateral side 126, and/or the medial side 128 as described herein may vary between articles of footwear. Furthermore, aspects of the article of footwear and individual components thereof, may also be described with reference to exact areas or portions of the article of footwear 100 and the scope of the appended claims herein may incorporate the limitations associated with these boundaries of the forefoot region 120, the midfoot region 122, the heel region 124, the lateral side 126, and/or the medial side 128 discussed herein.

With continued reference to FIGS. 1-5, an upper is configured to at least partially enclose the foot of a user and may be made from one or more materials. In the illustrated embodiment, the upper 102 is disposed above and is coupled to the sole structure 104, and defines the interior cavity 106 that receives and secures a foot of a user. The upper 102 may be defined by a foot region 140 and an ankle region 142 In general, the foot region 140 extends upwardly from the sole structure 104 and through the forefoot region 120 and the midfoot region 122, and, in some embodiments, into the heel region 124. The ankle region 142 is primarily located in the heel region 124; however, in some embodiments, the ankle region 142 may partially extend into the midfoot region 122.

The upper 102 extends along the entirety of each of the medial 128 and lateral 126 sides, as well as extending over the top of the forefoot region 120 and around the heel region 124. An upper can be formed from one or more layers. For example, many conventional uppers are formed from multiple elements, e.g., textiles, polymer foam, polymer sheets, leather, and synthetic leather, that are joined through bonding or stitching at a seam. In various embodiments, a knitted component may incorporate various types of yarn that may provide different properties to an upper. In other embodiments, the upper may incorporate multiple layers of different materials, each having different properties, for example, increased breathability or moisture wicking.

With reference to the material(s) that comprise the upper 102, the specific properties that a particular type of yarn will impart to an area of a knitted component may at least partially depend upon the materials that form the various filaments and fibers of the yarn. For example, cotton may provide a soft effect, biodegradability, or a natural aesthetic to a knitted material. Elastane and stretch polyester may each provide a knitted component with a desired elasticity and recovery. Rayon may provide a high luster and moisture absorbent material, wool may provide a material with an increased moisture absorbance, nylon may be a durable material that is abrasion-resistant, and polyester may provide a hydrophobic, durable material.

Other aspects of a knitted component may also be varied to affect the properties of the knitted component and provide desired attributes. For example, a yarn forming a knitted component may include monofilament yarn or multifilament yarn, or the yarn may include filaments that are each formed of two or more different materials. In addition, a knitted component may be formed using a particular knitting process to impart an area of a knitted component with particular properties. Accordingly, both the materials forming the yarn and other aspects of the yarn may be selected to impart a variety of properties to particular areas of the upper 102.

A number of other features may also be coupled to or included in an upper to provide or enhance certain properties of the upper. For example, the upper 102 can include a tongue 148 that may further include a tongue lining and/or a foam pad to increase comfort. The tongue 148 may be a separate component that is attached to the upper 102 or it may be integrally formed with one or more layers of the upper 102.

Additionally, an upper can also include a tensioning system, e.g., laces 150, that allows a user to adjust the upper to fit a foot of a user. The tensioning system can extend through a midfoot region and/or a forefoot region of the upper and may be attached to the upper by an attachment structure. For example, in the illustrated embodiment, the upper 102 includes a plurality of holes 152, e.g., punch holes or eyelets, that are configured to slidably receive the laces 150 so that the user can secure the article of footwear 100 to a foot, e.g., by tightening and tying the laces 150. In other embodiments, a tensioning system may be a laceless fastening system, or other type of tensioning system known in the art.

Further, in some instances, other elements, e.g., plastic material, logos, trademarks, etc., may also be applied and fixed to an exterior surface of the upper 102 using glue or a thermoforming process. In some embodiments, the properties associated with the upper 102, e.g., a stitch type, a yarn type, or characteristics associated with different stitch types or yarn types, such as elasticity, aesthetic appearance, thickness, air permeability, or scuff-resistance, may be varied.

With continued reference to FIGS. 1-5, the upper 102 is joined with the sole structure 104, which extends between the upper 102 and the ground. The sole structure 104 includes the midsole 112 and the outsole 114. In other embodiments, a sole structure may also include one or more other components, which may include a lasting board, a plate, or a strobel board (not shown), that are disposed between a midsole and an upper. Additionally, in some cases, a sole structure can further include a heel cup that couples with the upper in the heel region via an adhesive or stitching and provides additional support to a heel of a user. More specifically, a heel cup may be made from a rigid or semi-rigid material, for example TPU or a composite that allows the heel cup to flex or give as needed when a user is running or engaging in other activities, but otherwise provide more rigid support to the heel of a user. In some embodiments, a heel cup can be made of a translucent or clear TPU and may be used to enhance the aesthetic appeal.

The midsole 112 is defined as the portion of the sole structure 104 that extends between the upper 102 and the outsole 114. That is, the midsole 112 can be coupled with the upper 102, e.g., via the insole 108, at an upper surface of the midsole 112 and can be coupled with the outsole 114 on a lower surface of the midsole 112, opposite the upper 102. The midsole 112 extends along the length of the sole structure 104, throughout the forefoot region 120, the midfoot region 122, and the heel region 124. Additionally, the midsole 112 extends across the width of the sole structure 104 from a lateral side 126 to a medial side 128. However, in other embodiments, a midsole may include discrete midsole portions that only extend through portions of any of the forefoot region 120, the midfoot region 122, and the heel region 124.

The midsole 112 acts to cushion a user from the impact caused by the user's foot striking the ground. Put another way, the midsole 112 absorbs the impact resulting from a foot of a user coming into contact with the ground. To provide the desired cushioning characteristics, the thickness of the midsole 112, e.g., a dimension taken along a direction that is normal to the bottom surface 116, can be varied, with thicker regions providing greater cushioning and stability, e.g., the heel region 124 and thinner regions providing lesser cushioning and greater flexibility, e.g., the forefoot region 120.

The outsole 114 is defined as a portion of the sole structure 104 that at least partially contacts an exterior surface, e.g., the ground, when the article of footwear 100 is worn. Like the midsole 112, the outsole 114 can extend along the length of the sole structure 104, throughout the forefoot region 120, the midfoot region 122, and the heel region 124, and across the width of the sole structure 104 from a lateral side 126 to a medial side 128. However, in other embodiments, an outsole may include discrete outsole portions that only extend through portions of any of the forefoot region 120, the midfoot region 122, and the heel region 124. In some embodiments, the outsole 114 may be fabricated from an injection molded thermoplastic material, e.g., thermoplastic polyurethane, EVA, polyolefin elastomer, a rubber material, or mixtures thereof, which can resist wear resulting from contact with the ground in addition to increasing traction.

The present disclosure provides improved systems and methods for forming or manufacturing a foam component of a sole structure, in particular, a midsole, using a supercritical foaming process. More specifically, the systems and methods of the present disclosure provide a molding process that controls the expansion of the foam component to eliminate the need to compress a foam component to a final size after expansion, reducing cost and complexity of the manufacturing process while reducing cycle time. Further, by controlling expansion, the resultant foam component has more uniform density and cell size, while also reducing overall density and increasing resiliency and compressibility.

Figure 6:
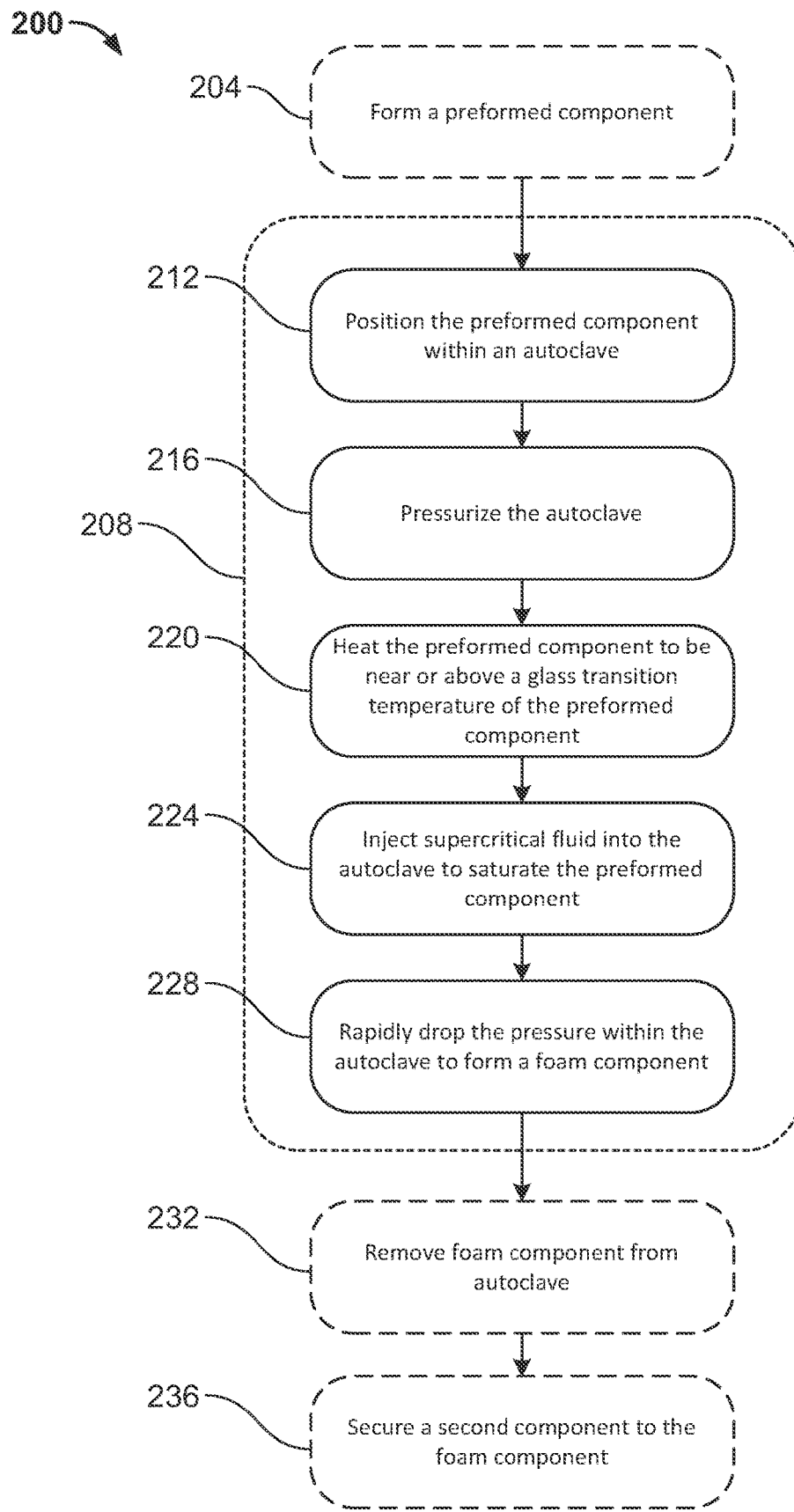
FIG. 6 is a flowchart outlining the steps in a method for manufacturing a sole assembly for an article of footwear.

FIG. 6 illustrates a method 200 for manufacturing a foam component for a sole structure, e.g., a midsole, or another portion of an article footwear. While the method 200 is described below with reference to various steps, it is appreciated that not all steps may be required. Further, the steps may not be carried out in the order presented below, and some steps may be performed simultaneously.

The method 200 may initiate at step 204 by forming a preformed component that, as described below, can be expanded in a foaming process to form the foam component. In some cases, the preformed component can be a single, solid component that is formed by injecting a first material into a cavity of a first mold. The first material may include a thermoplastic material, e.g., thermoplastic polyurethane (TPU), ethylene-vinyl acetate (EVA), nylon, nylon polyamide, thermoplastic polyester elastomer (TPEE), thermoplastic polyamide, polyolefin elastomer (POE), etc., or combinations thereof. For example, the first material can be a mixture of about 70% TPU and about 30% TPEE, or a mixture of about 78% EVA, about 10% TPEE, and about 12% POE. The first material can remain within the cavity of the first mold to cure or otherwise solidify into the preformed component. In other embodiments, the preformed component can include multiple preformed subcomponents that are coupled to one another to form the preformed component.

The one or more molds used to form the preformed component are configured so that the resultant preformed component is sized and shaped to be a substantially miniaturized version of the final foam component. That is, and as will be explained in greater detail below, the preformed component can share substantially the same geometry, e.g., an outer profile, a surface texture, or other decorative or performance elements, such as protrusions or recesses, of the final foam component to be formed. For example, the preformed component may be scaled down by a scale factor relative to a final, production-intent size, e.g., volume, of the final foam component being made, e.g., a midsole, that may be used in a sole structure of an article of footwear, e.g., the article of footwear 100. In particular, the size of the preformed component may be about 70% smaller, about 65% smaller, about 60% smaller, about 55% smaller, about 50% smaller, about 45% smaller, about 40% smaller, about 35% smaller, or about 30% smaller than the final, e.g., production-intent, size of the final foam component. Accordingly, in some embodiments, the initial size of the preformed component may be between about 70% and about 30% smaller, between about 65% and about 35% smaller, or between about 60% and about 40% smaller than the desired final size of the foam component. Additionally, in some embodiments, the initial size of the preformed component may be between about 70% and about 60% smaller, between about 50% and about 40% smaller, or between about 30% and about 20% smaller than the final size of the foam component. Thus, a scale factor between the initial size of the preformed component and a size of the final foam component can reduce a size of the preformed component by a predetermined amount, so that the preformed component may be expanded to form the foam component at the expanding or foaming process at step 208, discussed below.

In some embodiments, a preformed component may be uniformly scaled by a scale factor described, relative to the final size of the foam component. For example, the scaling of the preformed component can be uniform in volume about all coordinate axes defined by the sole assembly. However, it is also possible that, in some embodiments, the scale factors described herein may define a gradient across the sole assembly. For example, some portions of the sole assembly may be scaled down in volume greater or less than other portions of the sole assembly. In that regard, the mass properties of the formed final sole assembly may determine the magnitude of the scale factor along various portions of the preformed component, with portions of the preformed component that form regions with greater thickness or volume in the foam component being scaled down more than portions of the preformed component that form regions with lesser thickness or volume in the final foam component. That is, in some embodiments, a gradient defined by the scale factor may be correlated to a geometric characteristic of the final foam component, e.g., thickness, volume, or another geometric property defined along at least one coordinate axis, with areas that define a larger geometric characteristic being scaled down more than areas that define a smaller geometric characteristic. Further, in some embodiments, the scale factors described herein may scale down the preformed component in one direction or along one coordinate axis, e.g., a y-axis or the coordinate axis that is perpendicular to a ground upon which a user walks, or, with respect to the article of footwear 100, an axis that is normal to a bottom surface of the article of footwear 100. The preformed component, with the scaled-down size in one direction, may then be expanded along the one direction. In that regard, expansion of the preformed component along another one or more directions or axes may be restricted by an external structure, e.g., walls of a mold or autoclave.

Having formed or otherwise obtained the preformed component, the preformed component can undergo an expansion or foaming process at step 208 to form the foam component. The foaming process can begin by placing the preformed component into a cavity of an autoclave at step 212. The cavity of the autoclave has a volume that is larger than that of the preformed component, such that the preformed component only contacts a support surface, e.g., a bottom surface, of the autoclave upon which the preformed component is placed. Accordingly, in some cases, the autoclave can be sized to accept a plurality of preformed components, which can be expanded simultaneously. Further, while a mold release agent can be applied to the cavity before placing the preformed component in the cavity, the application of a mold release agent is not required since the preformed component is not compressed by and in contact with the walls of the cavity. By not including the mold release agent, process complexity and cycle time is reduced, and bonding between the foam component and other components, at later steps, can be improved, e.g., where the foam component is a midsole, between the midsole and an outsole, and between the midsole and an upper.

With the preformed component in the autoclave, the autoclave can then be pressurized at step 216. As will be described in greater detail below, the pressure is selected to achieve a desired expansion of a supercritical fluid that is introduced into the autoclave and absorbed by the preformed component, resulting from releasing the pressure. Additionally, it is also possible that the particular pressure can be selected in accordance with a blowing agent used in later steps, such that the blowing agent is a supercritical fluid within the autoclave. For example, the pressure within the cavity of the autoclave can be increased from a first or initial pressure, e.g., atmospheric pressure, to a second or maximum pressure. In some embodiments, the second pressure can be between about 5 megapascals (MPa) and about 35 MPa above the initial pressure, or more specifically, between about 10 MPa and about 30 MPa, between about 11 MPa and about 28 MPa, between about 13 MPa and about 28 MPa, between about 18 MPa and about 28 MPa, between about 15 MPa and about 28 MPa, or between about 15 MPa and about 20 MPa. In other embodiments, the second pressure can be less than about 10 MPa or greater than about 30 MPa.

At step 220, the autoclave can be heated to increase the temperature of the preformed component to near or above a glass transition temperature of a material of the preformed component, such that the preformed component may be in an at least partially molten state. Where the preformed component is made of one or more materials, the temperature may be near or above a glass transition temperature of any or all of the one or more materials. For example, in some cases the autoclave can be heated to between about 115 Celsius (C) and about 180 C., or more or less depending on the specific material being expanded. More specifically, the autoclave can be heated to be between about 120 C. and about 160 C., between about 120 C. and about 150 C., or between about 120 C. and about 135 C.

The specific pressure and temperature combination achieved in steps 216 and 220 can be selected to allow for a blowing agent, e.g., nitrogen, carbon dioxide, or another gas or combination of gases, to attain a supercritical state. In the supercritical state, the blowing agent does not exist in district liquid or gaseous state of matter and is also not a solid. Additionally, the specific temperature can be selected to reduce curing or dwell time at later steps. For example, thicker components may require higher temperatures than thinner parts in order to achieve similar cure times, or dwell times for a desired amount of saturation.

At step 224, a supercritical fluid, i.e., a blowing agent, can be injected into the cavity of the autoclave. The supercritical can be injected as a gas that then transitions to the super critical fluid, or a supercritical fluid can be injected directly into the autoclave. The supercritical fluid is preferably nitrogen gas ($N_2$), but can also be another type of fluid, for example, carbon dioxide gas ($CO_2$), or mixtures thereof. The supercritical fluid is held within the cavity of the autoclave for a predetermined period of time, e.g., a soak or dwell time, to allow the supercritical fluid to be absorbed by the preformed component such that the preformed component becomes (fully) saturated with the supercritical fluid. For example, the dwell time in some embodiments can range between about 90 minutes and about 240 minutes, between about 90 minutes and about 180 minutes, between about 120 minutes and about 240 minutes, between about 120 minutes and about 180 minutes, between about 100 minutes and about 180 minutes, or less than about 90 minutes, or more than about 180 minutes. The specific dwell time required to allow the supercritical fluid to penetrate and saturate the preformed component may vary depending on any of the pressure and temperature within the autoclave, size of the preformed component, and the material of the preformed component. In some embodiments, the dwell time can be selected to achieve partial saturation or full saturation of the preformed component.

In some embodiments, any of the step 216 of pressurizing the autoclave, the step 220 of raising a temperature of the autoclave, or the step 224 of injecting a supercritical fluid into the autoclave may occur simultaneously.

After saturating the preformed component, the pressure within the autoclave can be (rapidly) dropped, e.g., from the second pressure to a third or final pressure, at step 228. The third pressure can be equal to an initial pressure, an intermediate pressure between the first pressure and the second pressure, or a minimum pressure that is below the first pressure. The difference between in the second pressure and the third pressure can be selected to achieve a desired expansion ratio, e.g., a ratio of the volume of the foam component to a volume of the preformed component. For example, in some cases, the change in pressure may result in an expansion ratio of between about 1.0 and about 1.2, between about 1.2 and about 1.4, between about 1.4 and about 1.6, between about 1.6 and about 1.8, between about 1.8 and about 2.0, great than about 2.0, or any range therebetween. The change in pressure may occur over a predetermined period of time, or at a predetermined rate. The specific drop or rate in drop of the pressure can be selected to affect a substantially uniform expansion of the preformed component, for example, to create an approximately uniform cell size and material density throughout the resultant foam component. Further, by ensuring substantially uniform expansion, dimensional stability is preserved during expansion, allowing more minute and intricate details, e.g., protrusions, recesses, or textures, that have been formed into the preformed component, e.g., at step 204, to remain intact following expansion. Accordingly, any decorative or performance features that are present on the preformed component are also present on the foam component. In some embodiments, the pressure within the autoclave can be dropped, for example, by controlling the opening of a valve.

In particular, as a result of the drop in pressure, the supercritical fluid contained within the preformed component begins to nucleate and expand, thereby foaming the preformed component to form the foam component. Nucleation of the supercritical fluid forms (closed) supercritical-fluid-filled cells within the preformed component, which expand as the pressure drops and thereby increase the volume of the preformed component. The cells can have an approximately uniform size and distribution throughout the formed foam component. The cell size, e.g., an average cell size, can depend on the specific composition of the polymer that is being expanded and the expansion ratio. Also, because cell size and distribution are approximately uniform, the density throughout the foam component is also approximately uniform. Further, the drop in pressure results in a corresponding drop in the temperature of the preformed component. The drop in temperature can reduce the temperature of the preformed component to be below the glass transition temperature, re-solidifying, e.g., crystallizing, the material of the preformed component to form the foam component, thereby forming cells, i.e., pockets, of supercritical fluid, e.g., nitrogen or another blowing agent, in the midsole. Correspondingly, the cells are locked within the foam component to provide high-resilience and cushioning properties for the foam component, while also being lighter and less dense than foam components made with conventional processes. Moreover, due to re-solidification of the foam component, the foam component can be at or near final size following removal from the autoclave.

Additionally, because the resultant foam component is at or near final size when it is removed from the autoclave at step 232, the method 200 can eliminate the need for any subsequent compression steps to reduce the foam component to the final, production size. Specifically, in other known supercritical foaming methods, a foam component is typically foamed to an intermediate size, e.g., to an expansion ratio of 2.0, and then placed into a compression mold where the foam component is compressed to reduce the foam component to a final size, e.g., at an expansion ratio of 1.8 the foam component is generally held in the compression mold for a period of time to ensure that the final foam component does not re-expand when removed from the compression mold. The period of time for which the foam component is held under compression varies with temperature, but may generally range between 500 and 550 seconds, leading to increased complexity, cost, and cycle times. Further, compression molding steps generally require that a release agent be applied to the mold to prevent sticking that can damage the parts, but which also makes it more difficult to bond other components to the midsole at later steps. Moreover, compression can cause wrinkling of the outer surface or skin of the foam component, which may remain present in the final part. Eliminating the need to compress the foam component to a final size following the foaming process at step 208 reduces system cost and complexity. Relatedly, because the foam part is at or near its final size in the autoclave following step 228, wrinkling of the outer surface or skin can be reduced or eliminated, and the distribution and size, i.e., volume or a largest dimension, of cells remains substantially uniform.

In addition, foam components made using the method 200 exhibit more uniform and lower density than conventionally-made foam components. For example, as illustrated in Table 1 below, foam components produced using a subsequent compression molding step (CM foam), can have an average, full-piece density ranging from approximately 0.146 g/cm³ (grams per cubic centimeter) to approximately 0.159 g/cm³, but local densities throughout the foam component can vary by up to 58.3% of the average density. Comparatively, foam components made using the method 200 (MN foam) exhibit lower average densities of approximately 0.126 g/cm³, with local densities throughout the foam component varying by approximately 15% or less, e.g., plus or minus 0.02 g/cm³. Further, the CM foam components were generally harder and exhibited greater variance in hardness throughout the component, e.g., as high as 51%, as compared with the MN foam components, e.g., less than 6% (plus or minus 2' C.). In addition to exhibiting lower density and hardness, MN foam components also exhibited greater consistency in these properties between samples. It is appreciated the final hardness and density of a foam component can be controlled by adjusting the permitted expansion ratio, with lower permitted expansion ratios generally resulting in harder and more dense foam components.

TABLE 1

Test results comparing density and hardness of foam components made without subsequent compression (MN foam) and foam components made with a subsequent compression step (CM foam).

| | | Density | | Shore C Hardness | |
| --- | --- | --- | --- | --- | --- |
| | Sample | Local Variance [%] | Full-Piece [g/cm³] | Local Variance [%] | Full-Piece [' C] |
| MN Foam | MN-1 | <15 | 0.126 | <6 | 38 |
| | MN-2 | <15 | 0.126 | <6 | 38 |
| | MN-3 | <15 | 0.127 | <6 | 38 |
| CM Foam | CM-1 | 58.3 | 0.153 | 51 | 50 |
| | CM-2 | 16.7 | 0.146 | 26.5 | 50 |
| | CM-3 | 18.2 | 0.145 | 16.2 | 45 |
| | CM-4 | 18.2 | 0.141 | 13.5 | 45 |
| | CM-5 | 27.3 | 0.159 | 25.9 | 45 |
| | CM-6 | 18.2 | 0.159 | 23.5 | 45 |
| | CM-7 | 46.9 | 0.152 | — | — |

Following the foaming step 208, the foam component can be removed from the autoclave at step 232. It is appreciated that, in some cases, the foam component may be allowed to cool prior to or after removal from the autoclave at step 232. Additionally, following removal from the autoclave at step 232, one or more second components may be secured to the foam component at step 236. For example, where a foam component is a midsole, a second component can include any of an outsole, an upper, a plate, a midsole insert such as another cushioning element, etc. A second component can be secured to the foam component in numerous ways, including, for example, via stitching, overmolding, or an adhesive. In that regard, and as mentioned above, because the method 200 does not require the use of release agents, the foam component can form strong bonds with any secondary components using adhesives, which can, in some cases, be weakened by any release agent remaining on the foam component.

Figure 7:
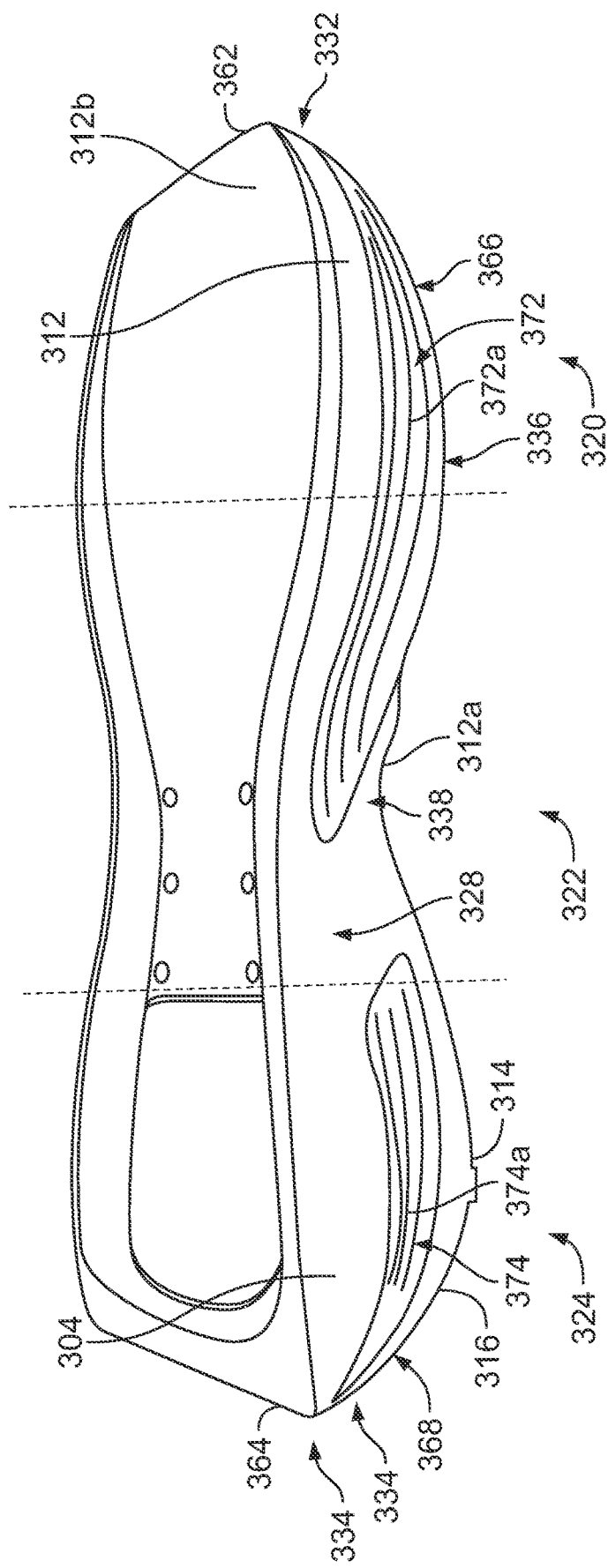
FIG. 7 is a top and medial perspective view of a sole structure for an article of footwear according to aspects of the disclosure, the sole structure including a midsole configured as a foam component that can be manufactured using the method of FIG. 6.
Figure 8:
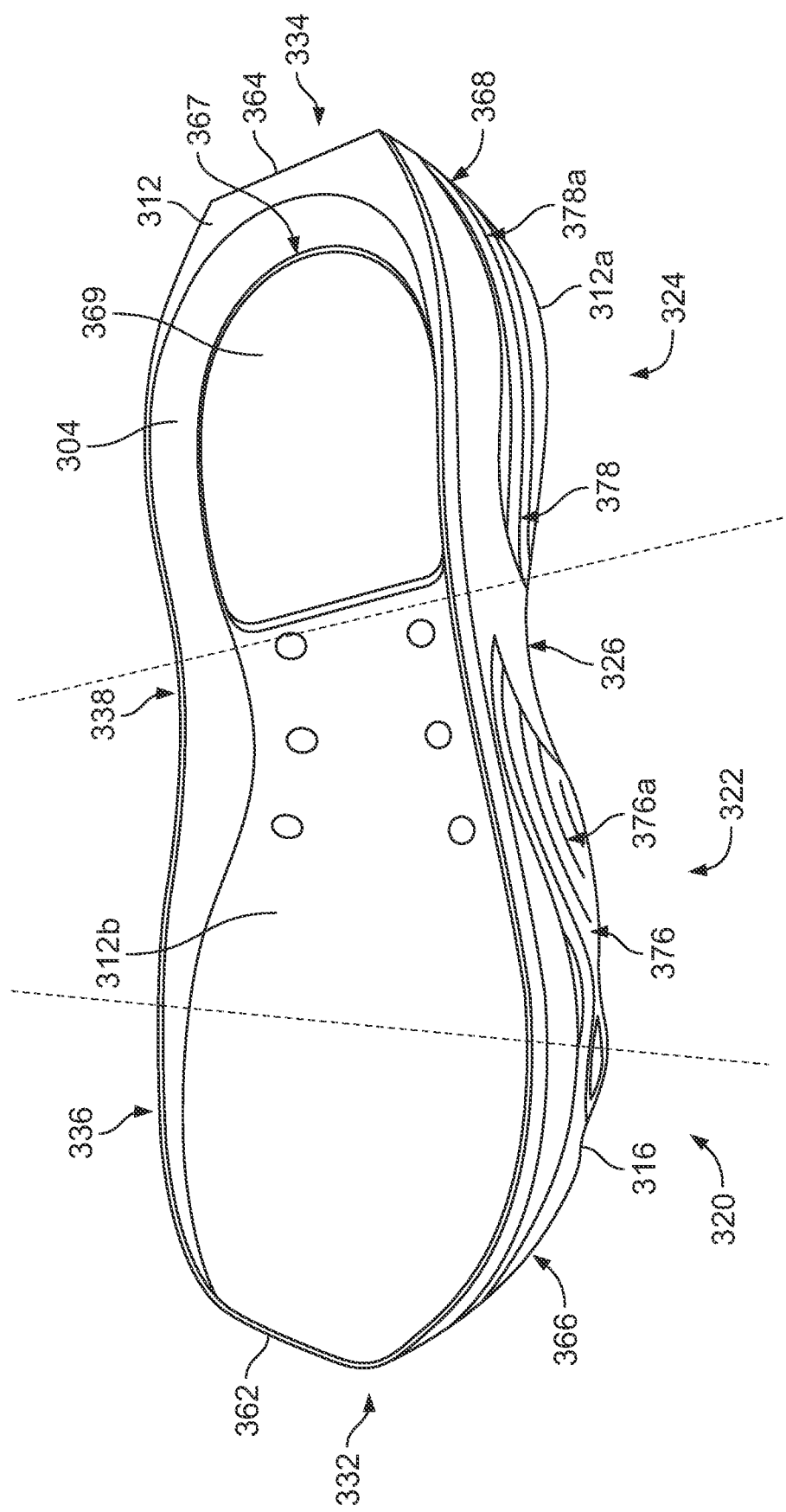
FIG. 8 is a top and lateral perspective view of the sole structure of FIG. 7.
Figure 9:
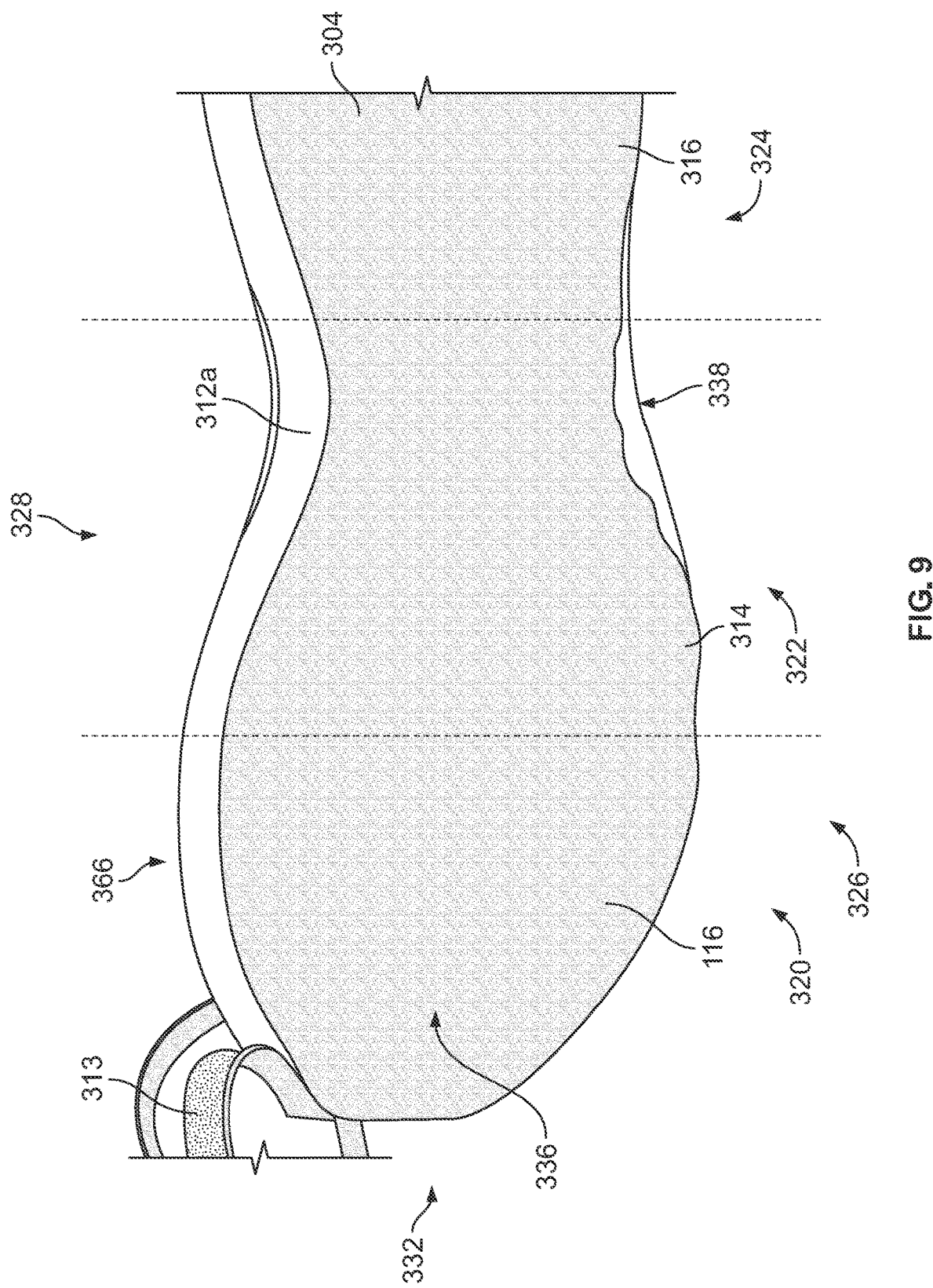
FIG. 9 is a partial bottom plan view of the sole structure of FIG. 7, with a portion of an outsole peeled back from the midsole to show the bond therebetween.
Figure 10:
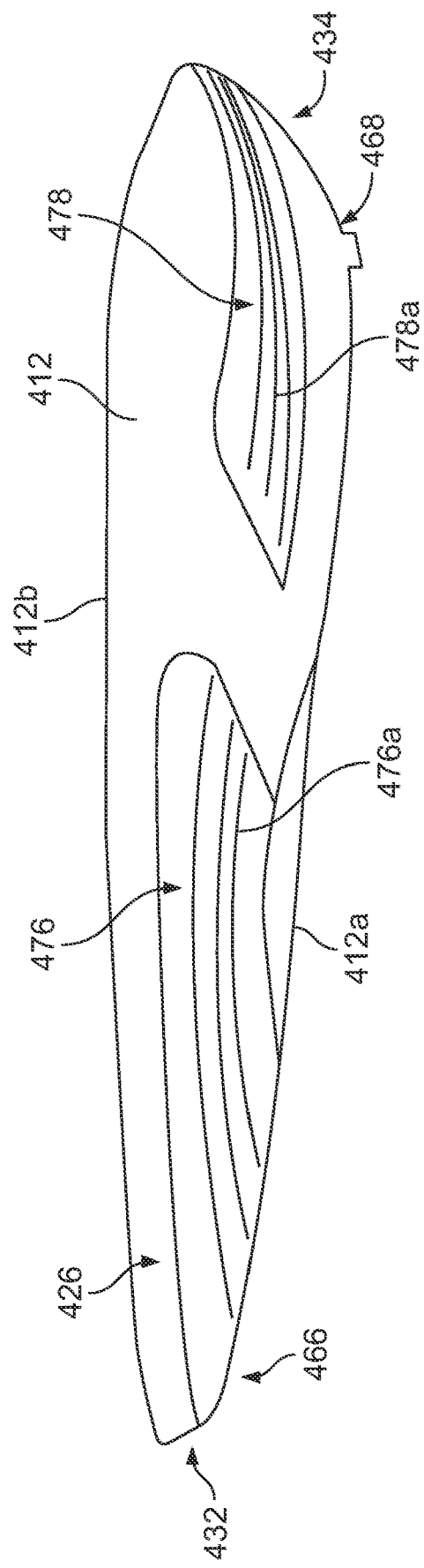
FIG. 10 is a lateral side view of a preformed component that can be used to form the midsole of the sole structure of FIG. 7.
Figure 11:
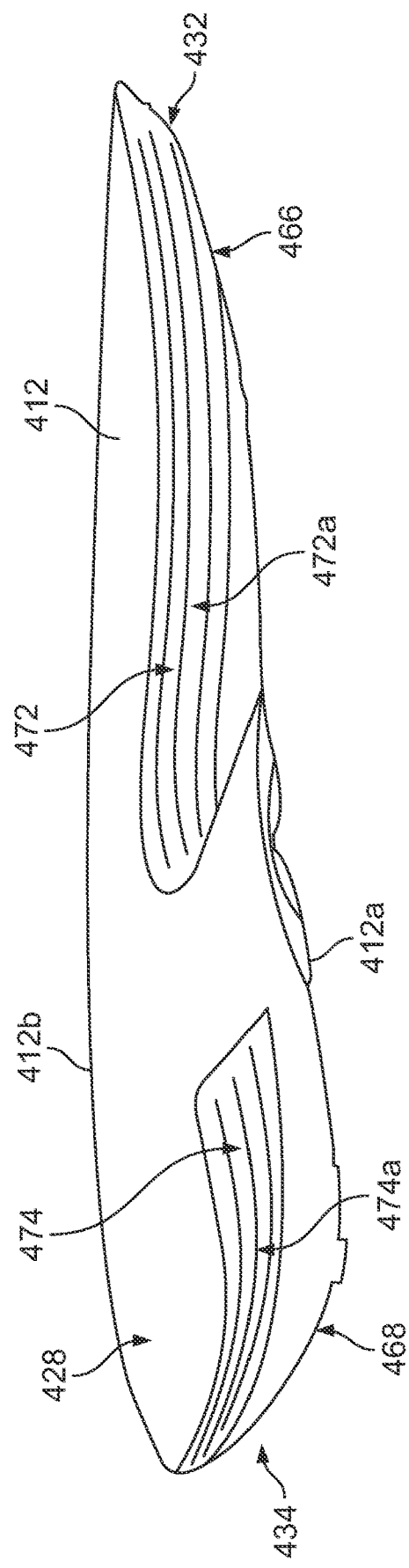
FIG. 11 is a medial side view of the preformed component of FIG. 10.
Figure 12:
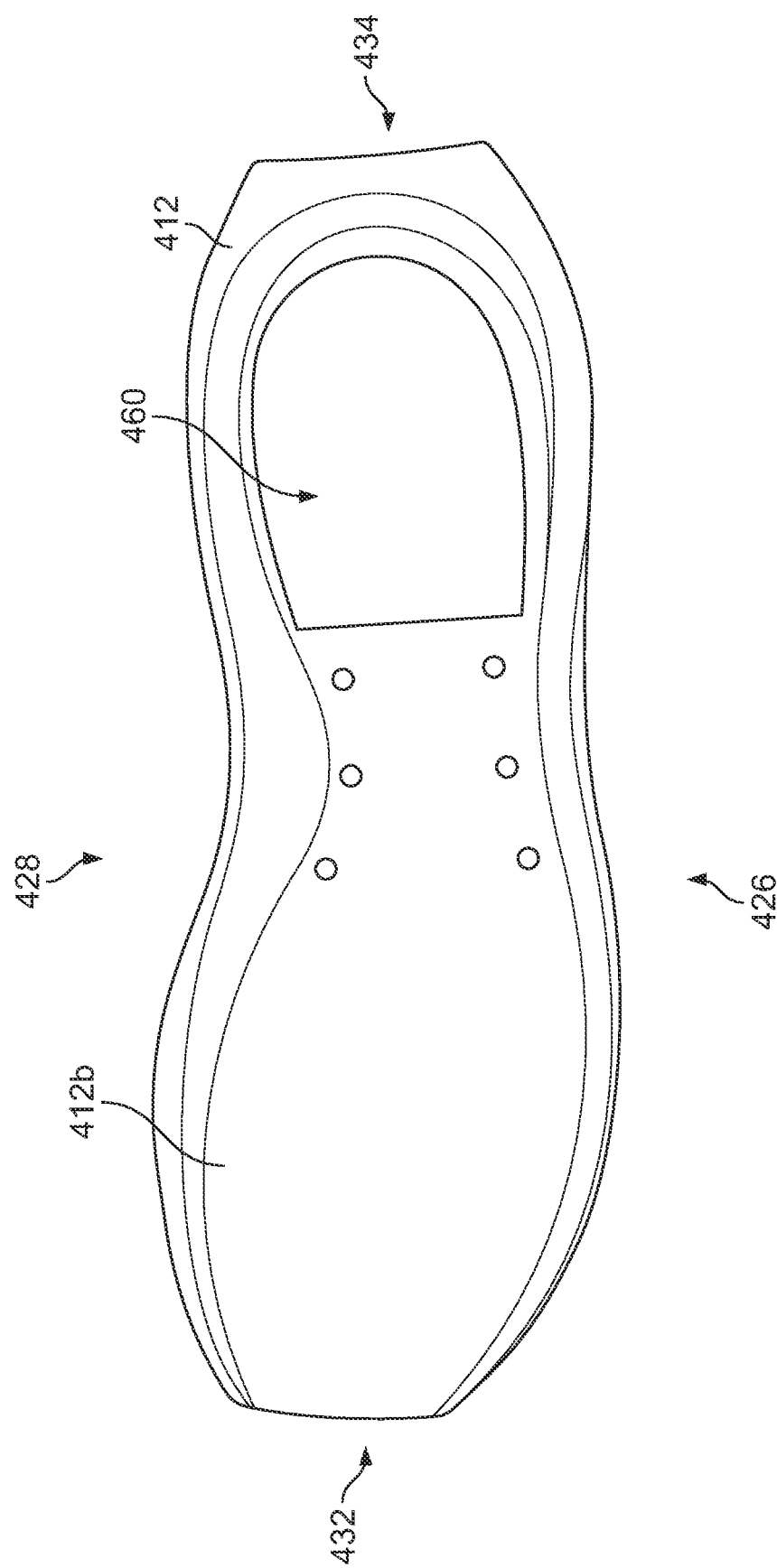
FIG. 12 is a top plan view of the preformed component of FIG. 10.
Figure 13:
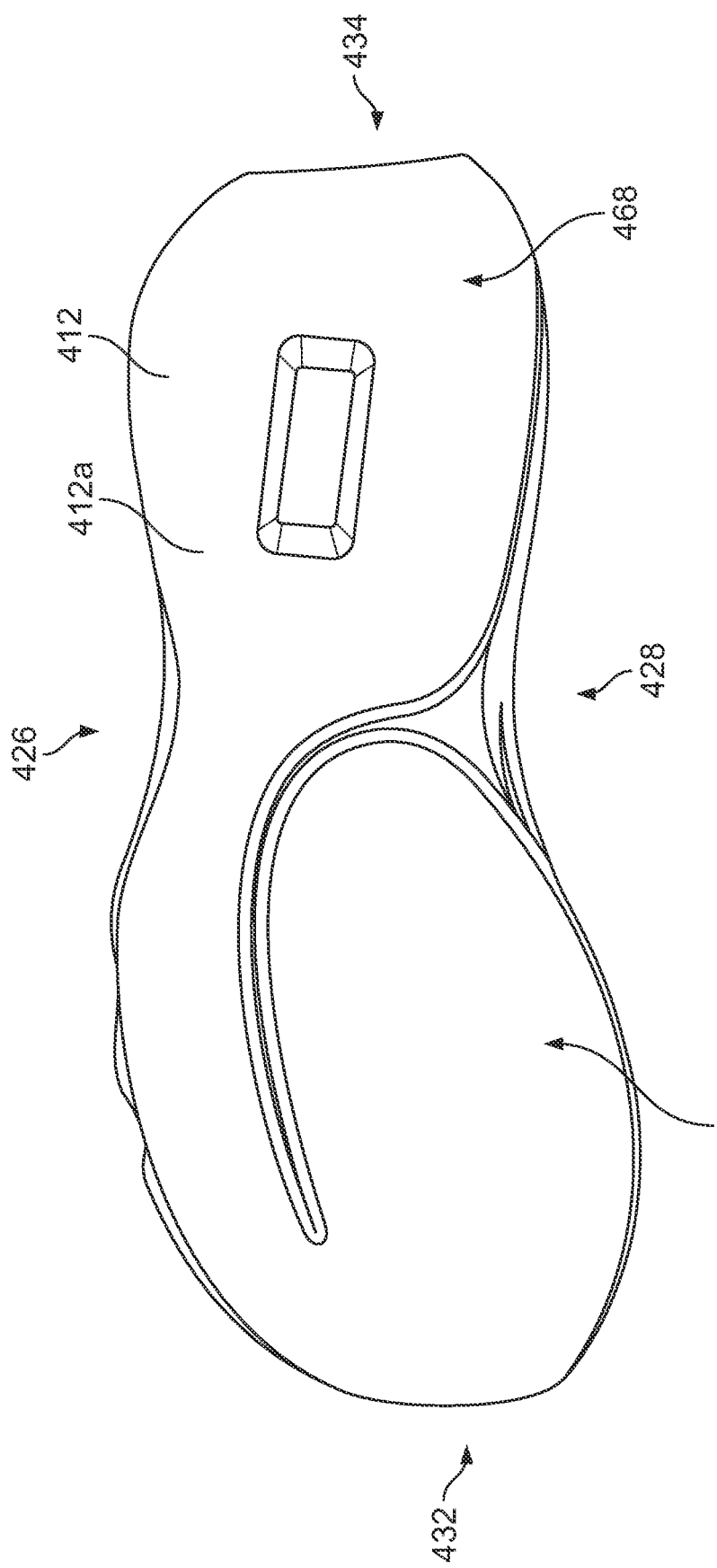
FIG. 13 is a bottom plan view of the preformed component of FIG. 10.

Turning now to FIGS. 7-9, an exemplary sole structure 304 is illustrated according to aspects of the disclosure, which can be included in an article of footwear. Similar to the sole structure 104, the sole structure 304 generally defines a forefoot region 320, a midfoot region 322, and a heel region 324. Additionally, the sole structure 304 also defines a lateral side 326 and a medial side 328 that are joined along a longitudinal axis 330 (not shown, see e.g., longitudinal axis 130 in FIGS. 4 and 5) that extends from a toe end 332 to a heel end 334.

The sole structure 304 includes a midsole 312 defining a lower midsole surface 312a opposite an upper midsole surface 312b. Additionally, the midsole 312 defines terminal edges 362, 364, at each of the toe end 332 and the heel end 334, respectively. The terminal edges 362, 364 extend approximately perpendicularly to the longitudinal axis 330, forming corners where terminal edges 362, 364 intersect the lateral and medial sides 326, 328, and the lower and upper midsole surfaces 312a, 312b. An outsole 314 (see FIG. 9) is secured to the lower midsole surface 312a to define a bottom surface 316 of the sole structure 304, and the top surface 312b is configured to receive and be secured to an upper 302 (not shown). Additionally, the upper midsole surface 312b defines a top recess 367 that is configured to receive a correspondingly-shaped insert 369 (see FIG. 8), which can provide additional cushioning in the heel region 324.

In the forefoot region 320, a thickness of the midsole 312, e.g., a distance taken normal to the lower midsole surface 312a between the lower midsole surface 312a and the upper midsole surface 312b, decreases so that the lower midsole surface 312a curves upward along a curved region 366 from approximately a widest portion 336 to the terminal edge 362 at the toe end 332. The thinning and corresponding curvature of the midsole 312 in the curved region 366 helps to improve flexibility of the sole structure 304. Similarly, a thickness of the midsole 312 decreases moving along the longitudinal axis 330 from approximately a midway point 324a of the heel region 324 to the terminal edge 364 at the heel end 334. Accordingly, the heel region 324 defines a curved region 368, approximately where a user's heel first strikes the ground when taking a step. In this way, the curved region 368 can provide increased traction at first contact and allows the foot of a user to effectively roll along the curved region 368. In the illustrated embodiment, the curved region 368 has approximately constant curvature. However, in other embodiments, the curvature may vary along the length of the curved region, for example to follow a parabolic curve. Relatedly, the curved region 368 may also begin closer to either of the heel end 334 or the toe end 332, for example, to begin adjacent the midfoot region 322.

The midsole 312 also defines curvilinear recesses on each of the lateral side 326 and the medial side 328. More specifically, as illustrated in FIG. 7, the medial side 328 includes a first medial recess 372 and a second medial recess 374. The first medial recess 372 extends from approximately a thinnest portion 338 of the sole structure 304 to the toe end 332. The second medial recess 374 extends from approximately the intersection of the midfoot region 322 and the heel region 324 to the heel end 334. Each of the first medial recess 372 and the second medial recess 374 are curved to generally follow a contour of the lower midsole surface 312a. Additionally, a width of each of the first medial recess 372 and the second medial recess 374, e.g., a distance corresponding to a thickness of the midsole 312, gradually reduces moving to the toe end 332 and the heel end 334, respectively. That is, a change in a local width of the first medial recess 372 and the second medial recess 374 corresponds with a change in a local thickness of the midsole 312. Further still, each of the first medial recess 372 and the second medial recess 374 include a plurality of sub-grooves 372a, 374a extending along their respective lengths. The distances between adjacent grooves changes with the width of the respective recess.

Similarly, as illustrated in FIG. 8, the lateral side 326 also includes a first lateral recess 376 and a second lateral recess 378. The first lateral recess 376 is arranged similarly to the first medial recess 372, including having sub-grooves 376a, and the second lateral recess 378 is arranged similarly to the second medial recess 374, including having sub-grooves 378a. In other embodiments, the medial side 328 and lateral side 326 may include more or less recesses, or none at all. Relatedly, the medial side 328 and the lateral side 326 can be configured differently from one another and may include other design features, for example, protrusions, recesses, or textures.

The midsole 312 can be a foam component that can be manufactured using the method 200 described above. In that regard, FIGS. 10-13 illustrate a preformed component 412 that can be used to manufacture the midsole 312. The preformed component 412, can be formed in accordance with step 204 and then foamed in accordance with step 208 to form the midsole 312. As discussed above, the preformed component 412 is a substantially scaled down version of the midsole 312. That is, the preformed component 412 shares a substantially similar and scaled-down geometry with the midsole 312. In particular, the preformed component 412 defines a bottom surface 412a opposite the top surface 412b, which extends between a toe end 432 and a heel end 434. The bottom surface 412a defines curved regions 466, 468 that are similar to curved regions 366, 368, and the top surface 412b includes a recess 460. Relatedly, the preformed component 412 also defines a lateral side 426 including first and second lateral recesses 476, 478, each with a respective plurality of sub-grooves 376a, 478a, and a medial side 428 including first and second medial recesses 472, 474, each with a respective plurality of sub-grooves 372a, 374a. These features remain dimensionally stable, e.g., undergoing uniform expansion, during expansion of the preformed component 312 in the autoclave at step 228 so that they are present on the midsole 312 when it is removed from the autoclave at step 232.

Further, after removal from the autoclave, the outsole 314 can be secured to the midsole 312 by an adhesive at step 236. As shown in FIG. 9, because the method 200 does not require a release agent, a strong, resilient bond can be formed between the midsole 312 and the outsole 314, such that failure of the bond between the midsole 312 and the outsole 314 is due to tearing of one of the midsole 312 or the outsole 314, rather than the adhesive itself. Here, portions 313 of the midsole 312 remain adhered to the outsole 314 where the outsole 314 has been peeled away from the midsole 312.

Figure 14:
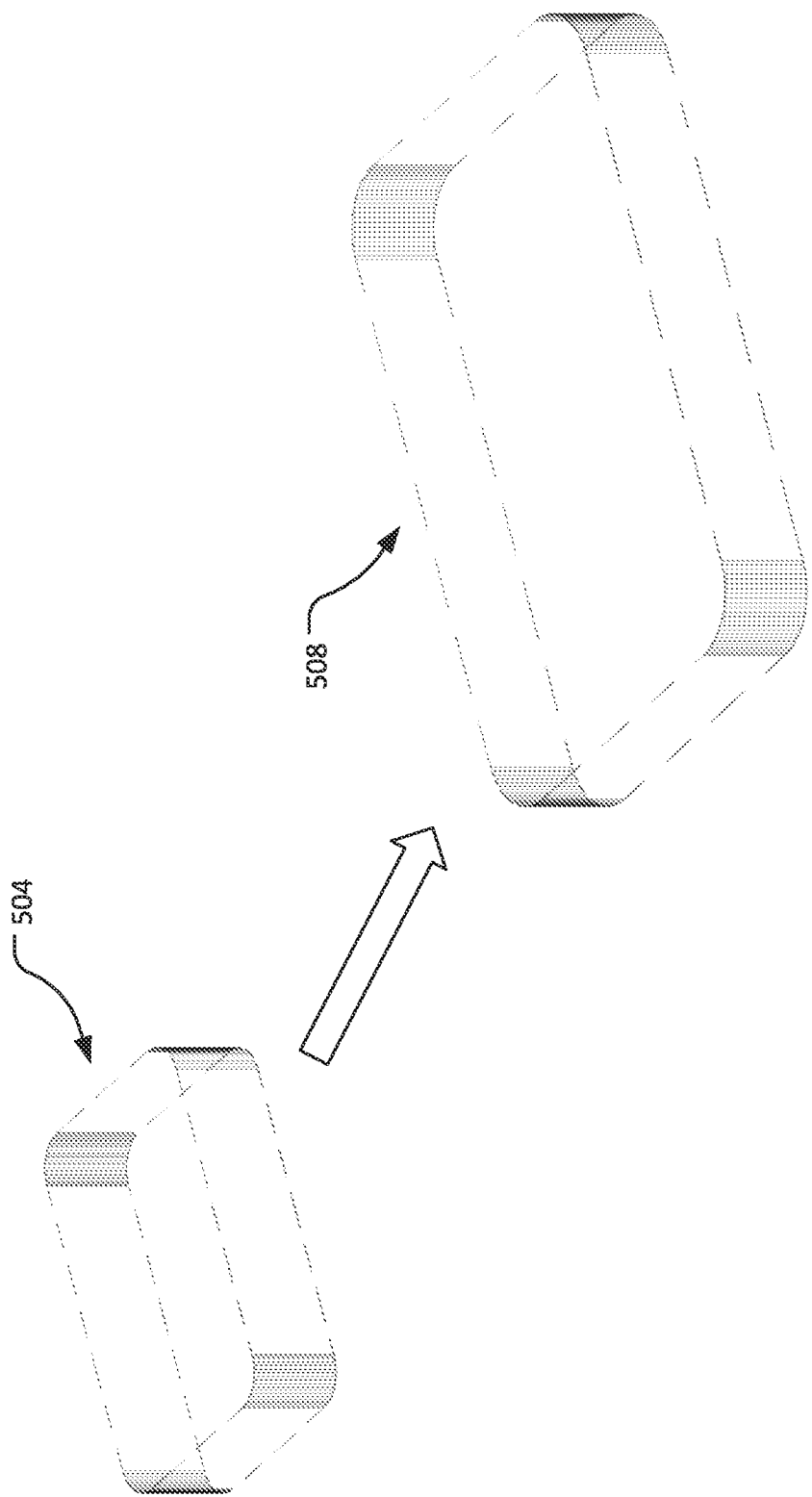
FIG. 14 is a schematic view illustrating a foam component that can be manufactured from a preformed component using the method of FIG. 6.
Figure 15:
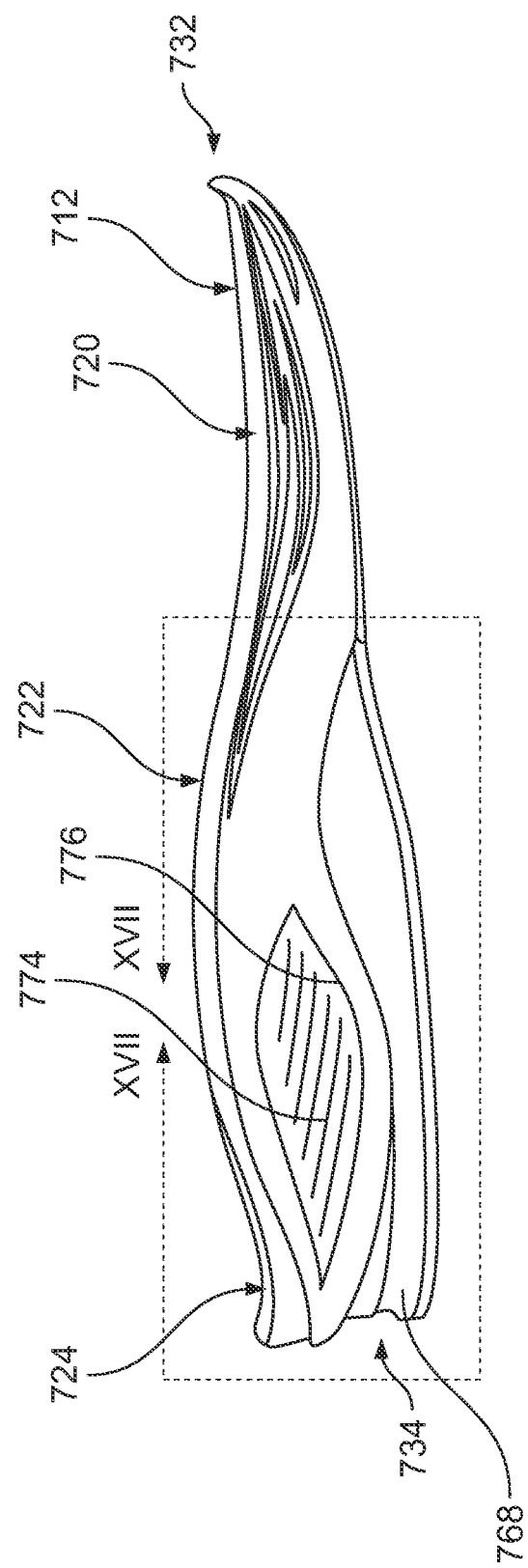
FIG. 15 is a medial side view illustrating another preformed component.
Figure 16:
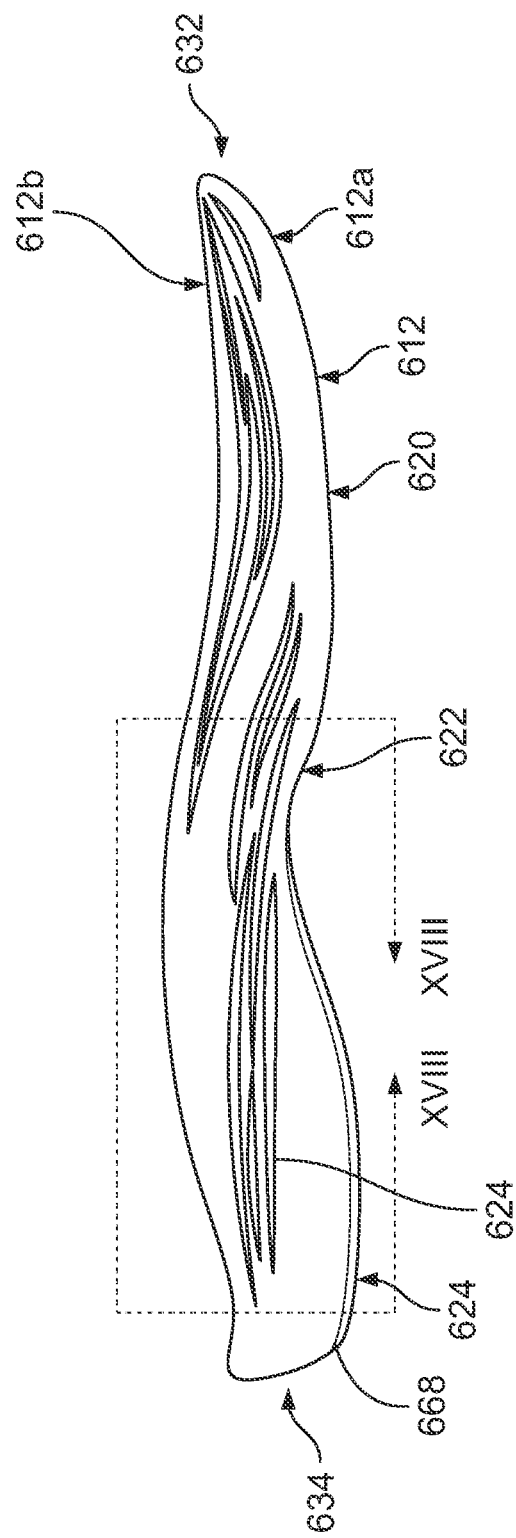
FIG. 16 is a medial side view illustrating another foam component that can be manufactured from the preformed component of FIG. 15, using the method of FIG. 6.
Figure 17:
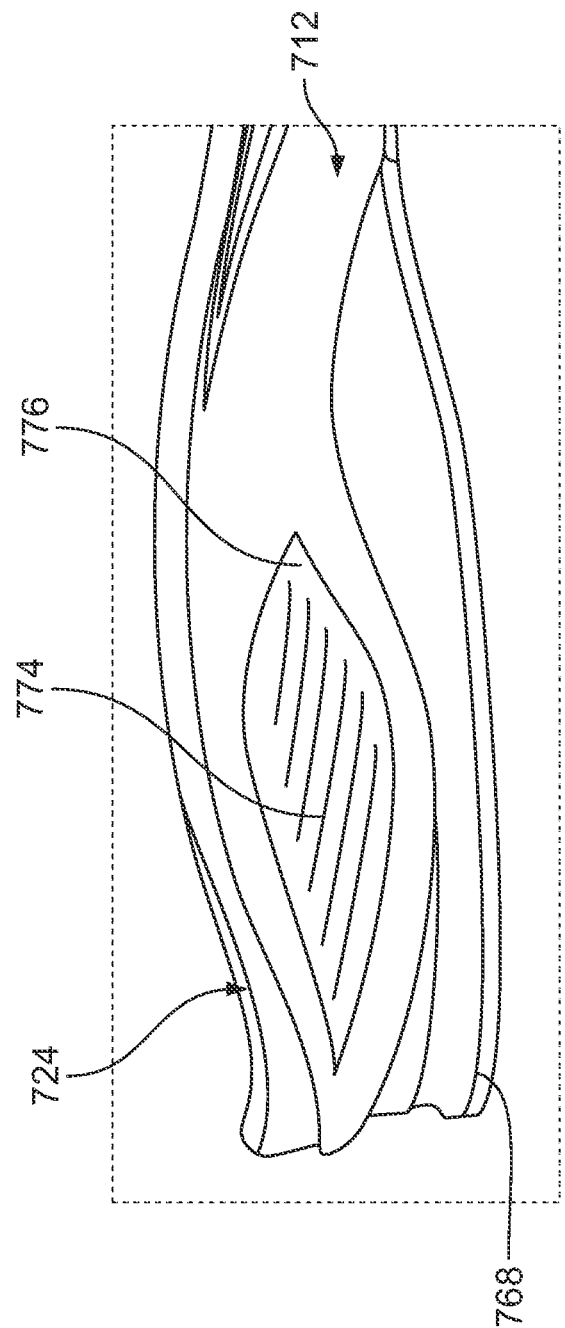
FIG. 17 is a detail view of the preformed component of FIG. 15 taken about line XVII-XVII.

Turning now to FIG. 14, the method 200, as described above, can be used to form a variety of foam components for use in many different types of articles of clothing, e.g., safety equipment, athletic equipment, footwear, undergarments, etc., as well other types of articles of manufacture incorporating foam components, e.g., furniture, vehicle components, padded mats, etc. Accordingly, as illustrated in FIG. 14, a preformed component 504 can be expanded, i.e., foamed, to form a corresponding foam component 508 using the method 200, or portions thereof, in particular the foaming step 208. The preformed component 504 and the foam component 508 can have any shape as required by a specific application.

For example, FIGS. 15-18 illustrate another midsole 612, i.e., a foam component, and a corresponding preformed component 712 that can be used to form the midsole 612 using the method 200. The preformed component 712 can be shaped to account for varying material thickness so that the midsole 612 attains a desired, final shape following expansion. In particular, the midsole 612 generally increases in thickness, e.g., a dimension between a bottom surface 612a and a top surface 612b, moving from the toe end 632 to the heel end 634, e.g., moving from the forefoot region 620, through the midfoot region 622, to the heel region 624. Correspondingly, the preformed component 712 also generally increases in thickness moving from a toe end 732 corresponding to the toe end 632, to a heel end 774 corresponding with the heel end 634, e.g., moving from a forefoot region 720, through the midfoot region 722, to a heel region 724.

As a desired thickness of a foam component increases, the expansion characteristics of the preformed component can change so that the preformed component includes features that deviate from those in the final foam component. That is, features that present on the final foam component may be shaped differently in a preformed component to account for the different expansion characteristics that result from different material thicknesses. In some cases, other factors may also influence the shape of a preformed component that is needed to create a desired shape in the final foam component. Such factors can include, for example, the type of material of the preform component, i.e., the chemical compositions the type of supercritical fluid being used, or the pressures and temperatures used for foaming of the preformed component, and the desired geometry of a final foam component.

For example, as best illustrated in FIG. 18, the heel region 624 of the midsole 612 includes a plurality of curvilinear ridges 674 that protrude outwardly from a side of the midsole 612. To account for the increased thickness of the midsole 612 in the heel region 624, the preformed component 712 also includes a corresponding plurality of ridges 774, but which are positioned within a recess area 776 of the heel region 724 (see FIG. 17). During expansion, e.g., foaming at step 208, the increased material thickness near the recess 776 results in greater expansion in the recess 776, such that the recess 776 has no equivalent feature that is visible in the midsole 612. Instead, the resultant ridges 674 of the midsole 612 extend outwardly from a generally continuous and smooth surface along the side of the midsole 612.

As another example, the midsole 612 includes a curved region 668 at the heel end 634 (see FIG. 116), where a user's foot typically first contacts the ground. Correspondingly, due to the increased material thickness, the preformed component 712 includes a peripheral channel 768 that wraps round the heel region 724 of the preformed component 712, e.g., to extend from a medial side, around the heel end 734, to a lateral side (see FIG. 15). Following expansion at step 208, the material in the channel 768 can expand to form the substantially smooth surface of the curved region 668.

Any of the embodiments described herein may be modified to include any of the structures or methodologies disclosed in connection with different embodiments. Further, the present disclosure is not limited to articles of footwear of the type specifically shown. Still further, aspects of the articles of footwear of any of the embodiments disclosed herein may be modified to work with any type of footwear, apparel, or other athletic equipment.

As noted previously, it will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims

INDUSTRIAL APPLICABILITY

Numerous modifications to the present disclosure will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

We claim:

1. A method for manufacturing a foam component of a sole structure, the method comprising:
    positioning a preformed component within a cavity of an autoclave, the preformed component shaped based on a non-uniform scale factor applied based on a desired final shape of the foam component;
    heating the preformed component to be at or above a glass transition temperature of a material of the preformed component;
    pressurizing the autoclave;
    injecting a blowing agent into the cavity of the autoclave, the blowing agent becoming a supercritical fluid that saturates the preformed component; and
    dropping the pressure within the cavity of the autoclave to cause nucleation of the supercritical fluid within the preformed component, and to expand and crystallize the material of the preformed component to form the final shape of the foam component, wherein that a density of the foam component has a variance of less than or equal to approximately 15%.

2. The method of claim 1, wherein an expansion ratio between the preformed component and the foam component is between about 1.4 and about 1.8.

3. The method of claim 2, wherein the expansion ratio is about 1.6.

4. The method of claim 1, further comprising forming the preformed component by injecting the material of the preformed component, in a liquid state, into a mold and allowing the material to cure to form a solid body.

5. The method of claim 4, wherein the material of the preformed component is a thermoplastic polymer.

6. The method of claim 1, wherein a release agent is not applied to the preform component.

7. The method of claim 1, further comprising removing the foam component from the autoclave and securing a second component to the foam component by at least one of:
    applying an adhesive between the foam component and the second component; or
    overmolding the second component onto the foam component.

8. The method of claim 7, wherein the foam component is a midsole and the second component is at least one of an upper or a midsole.

9. The method of claim 1, wherein the foam component includes a plurality of cells with approximately uniform size and distribution throughout the foam component.

10. The method of claim 1, wherein an average density of the foam component is less than approximately 0.13 g/cm$^3$.

11. The method of claim 1, wherein a shore C hardness of the foam component has a variance of less than or equal to approximately 6%.

12. The method of claim 1, wherein the blowing agent is nitrogen gas.

13. The method of claim 1, wherein pressurizing the autoclave includes raising a pressure within the cavity of the autoclave from a first pressure to a second pressure, and
    wherein dropping the pressure includes reducing the pressure within the cavity of the autoclave from the second pressure to a third pressure.

14. The method of claim 13, wherein the third pressure is at or below the first pressure.

15. A method for manufacturing a sole structure, the method comprising:
    forming a preformed component;
    foaming the preformed component to form a midsole, the preformed component shaped based on a non-uniform scale factor applied based on a desired final shape of the midsole, including:
        positioning the preformed component within an autoclave,
        heating the preformed component to be at or above a glass transition temperature of the preformed component,
        pressurizing the autoclave,
        saturating the preformed component with a supercritical fluid, and
        dropping the pressure within the autoclave to cause nucleation of the supercritical fluid within the preformed component, and to expand and crystallize a material of the preformed component to form the final shape of the midsole, wherein a density of the midsole has a variance of less than or equal to approximately 15%;
    removing the midsole from the autoclave; and
    securing an outsole to a bottom surface of the midsole.

16. The method of claim 15, wherein the midsole is at a final size upon removal from the autoclave.

17. A method for manufacturing a foam component of a sole structure, the method comprising:
    positioning a preformed component within a cavity of an autoclave, the preformed component shaped based on a non-uniform scale factor applied based on a desired final shape of the foam component;
    heating the preformed component to be at a first temperature that is at or above a glass transition temperature of a material of the preformed component;
    pressurizing the autoclave, wherein the pressure is selected in accordance with the first temperature so that a blowing agent within the autoclave becomes a supercritical fluid; and
    dropping the pressure within the cavity to cause nucleation of the supercritical fluid within the preformed component, and to expand and crystallize the material of the preformed component to form the final shape of the foam component, the foam component expanding to be at a final size within the autoclave, wherein an expansion ratio between the preformed component and the foam component is between about 1.4 and about 1.8.

18. The method of claim 17, further comprising injecting the blowing agent into the autoclave, wherein the blowing agent is nitrogen gas.

19. The method of claim 17, further comprising allowing the supercritical fluid to saturate the preformed component for a predetermined period of time.

20. A method for manufacturing a foam component, the method comprising:
- positioning a preformed component within a cavity of an autoclave, the preformed component shaped based on a non-uniform scale factor applied based on a desired final shape of the foam component;
- heating the preformed component;
- pressurizing the autoclave;
- injecting a blowing agent into the cavity of the autoclave, the blowing agent becoming a supercritical fluid that saturates the preformed component; and
- dropping the pressure within the cavity of the autoclave to cause nucleation of the supercritical fluid within the preformed component, and to expand and crystallize the material of the preformed component to form the final shape of the foam component, wherein that a density of the foam component has a variance of less than or equal to approximately 15%.

\* \* \* \* \*